United States Patent
Ito

(10) Patent No.: US 11,873,254 B2
(45) Date of Patent: Jan. 16, 2024

(54) ZIRCONIA COMPOSITION, PRE-SINTERED BODY AND SINTERED BODY, AND METHOD OF PRODUCING THE SAME

(71) Applicant: KURARAY NORITAKE DENTAL INC., Kurashiki (JP)

(72) Inventor: Yoshihisa Ito, Miyoshi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 0 days.

(21) Appl. No.: 17/932,439

(22) Filed: Sep. 15, 2022

(65) Prior Publication Data

US 2023/0028118 A1   Jan. 26, 2023

Related U.S. Application Data

(62) Division of application No. 16/334,499, filed as application No. PCT/JP2017/033980 on Sep. 20, 2017, now Pat. No. 11,535,564.

(30) Foreign Application Priority Data

Sep. 20, 2016 (JP) ................. 2016-183129

(51) Int. Cl.
*C04B 35/48* (2006.01)
*A61C 5/73* (2017.01)

(52) U.S. Cl.
CPC ........... *C04B 35/48* (2013.01); *A61C 5/73* (2017.02); *C04B 2235/3225* (2013.01); *C04B 2235/785* (2013.01); *C04B 2235/9646* (2013.01)

(58) Field of Classification Search
CPC ........... C04B 35/48; C04B 2235/3225; C04B 2235/785; C04B 2235/9646; C04B 2235/3246; C04B 2235/5445; C04B 2235/5454; C04B 2235/608; C04B 35/64; C04B 2235/5436
See application file for complete search history.

(56) References Cited

U.S. PATENT DOCUMENTS

| 4,891,343 A | 1/1990 | Quadair |
| 2004/0192535 A1 | 9/2004 | Tanaka et al. |
| 2007/0237971 A1 | 10/2007 | Saint-Ramond et al. |

(Continued)

FOREIGN PATENT DOCUMENTS

| CN | 105164084 A | 12/2015 |
| JP | 2-88423 A | 3/1990 |

(Continued)

OTHER PUBLICATIONS

International Search Report dated Dec. 19, 2017 in PCT/JP2017/033980 filed on Sep. 20, 2017.

(Continued)

*Primary Examiner* — Karl E Group
*Assistant Examiner* — Cameron K Miller
(74) *Attorney, Agent, or Firm* — Oblon, McClelland, Maier & Neustadt, L.L.P.

(57) ABSTRACT

A composition comprises a zirconia powder, in which 55% or more thereof is monoclinic, and a stabilizer capable of suppressing phase transition of zirconia. An average particle diameter of zirconia particles and particles of the stabilizer is 0.06 μm to 0.17 μm. At least a portion of the stabilizer does not form a solid solution with zirconia.

16 Claims, 9 Drawing Sheets

(56) References Cited

U.S. PATENT DOCUMENTS

| | | | |
|---|---|---|---|
| 2008/0088067 A1* | 4/2008 | Saint-Ramond | C04B 35/486 264/485 |
| 2008/0090100 A1 | 4/2008 | Saint-Ramond et al. | |
| 2010/0233579 A1 | 9/2010 | Laube et al. | |
| 2016/0081777 A1 | 3/2016 | Yamada et al. | |
| 2016/0310245 A1 | 10/2016 | Fujisaki et al. | |

FOREIGN PATENT DOCUMENTS

| | | |
|---|---|---|
| JP | 2010-500957 A | 1/2010 |
| JP | 2010-209472 A | 9/2010 |
| JP | 2013-100222 A | 5/2013 |
| JP | 2013-230981 A | 11/2013 |
| JP | 2014-218418 A | 11/2014 |
| JP | 2014-218421 | 11/2014 |
| KR | 10-2011-0018652 | 2/2011 |
| WO | WO 2015/098765 A1 | 7/2015 |
| WO | WO 2016/104724 A1 | 6/2016 |

OTHER PUBLICATIONS

Extended European Search Report dated Apr. 15, 2020 in European Patent Application No. 17853100.0 citing document 7 therein, 8 pages.

Office Action dated Oct. 8, 2021 for the corresponding Chinese Application No. 201780057926.5 (with machine translation).

Wikipedia article Titled—"Zirconium Dioxide" https://en.wikipedia.org/wiki/Zirconium_dioxide (Year: 2022).

\* cited by examiner

ZIRCONIA COMPOSITION, PRE-SINTERED BODY AND SINTERED BODY, AND METHOD OF PRODUCING THE SAME

RELATED APPLICATION

The present disclosure is a divisional of U.S. application Ser. No. 16/334,499, filed on Mar. 19, 2019, which is a national stage entry of PCT/JP2017/033980, filed on Sep. 20, 2017, and is based upon and claims the benefit of the priority of the Japanese Patent Application No. 2016-183129 (filed on Sep. 20, 2016), the disclosure of which is incorporated herein in its entirety by reference.

FIELD OF THE INVENTION

The present disclosure relates to a composition predominantly containing zirconia (zirconium oxide (IV); $ZrO_2$). The present disclosure also relates to a zirconia pre-sintered body and sintered body. Furthermore, the present disclosure relates to a method of producing a zirconia composition, pre-sintered body, and sintered body.

BACKGROUND OF THE INVENTION

Zirconia is a compound in which phase transition occurs among a plurality of crystal systems. Therefore, partially-stabilized zirconia (PSZ) and fully-stabilized zirconia, in which a stabilizer such as yttria (yttrium oxide; $Y_2O_3$) forms a solid solution with zirconia to suppress phase transition, are utilized in a variety of fields. For example, Patent Literature 1 discloses a sintered body of partially-stabilized zirconia for use as a dental material.

A translucent zirconia sintered body disclosed in Patent Literature 1 is produced by sintering a press-molding body of zirconia powder under the condition of 1450° C., at a temperature-raising rate of 600° C./hr and a retention time of 2 hours. The zirconia powder contains more than 4.0 mol % and at most 6.5 mol % of yttria and less than 0.1 wt % of alumina, and has a BET specific surface area of from 8 to 15 $m^2$/g, an average particle size of from 0.40 to 0.50 μm, and the total proportion of tetragonal and cubic contained in the crystal is at least 80%.

CITATION LIST

Patent Literature

[PATENT LITERATURE 1] WO 2015/098765 A1

DISCLOSURE OF THE INVENTION

Problem to be Solved by the Invention

In general, a zirconia sintered body formed by sintering zirconia particles (powder) has a high strength, and it is thus not easy to directly process the zirconia sintered body in a mechanical manner to a desired shape. As such, shaping of the zirconia sintered body may be performed on a block-shaped pre-sintered body that is formed by firing a pressed body of the zirconia powder (including a shaped body subjected to the cold isostatic pressing (CIP) process) at a temperature not leading to sintering (hereinafter, referred to as "pre-sintering"). In this case, the block-shaped body of the zirconia pre-sintered body is formed into a desired shape via cutting process, etc., and the formed pre-sintered body is fired at a sintering temperature or higher to produce a zirconia sintered body having a shape of interest.

When fired, the pressed body of the zirconia powder shrinks depending on a firing temperature. For example, the pressed body shrinks about 1% until becoming the pre-sintered body, and about 20% until becoming the sintered body. Therefore, considering these shrinkage factors, the pre-sintered body is shaped such that dimensions thereof are larger than those of the sintered body, which is the final object. For example, the size of the shaped, pre-sintered body is determined based on a coefficient calculated by subtracting a shrinkage factor from the pressed body of the powder to the pre-sintered body from a shrinkage factor from the pressed body to the sintered body.

Accordingly, when a plurality of pressed bodies are fired in one firing furnace to produce a plurality of pre-sintered bodies (block-shaped bodies), desired is a zirconia composition in which shrinkage factors from the pressed body to the pre-sintered body are unlikely to be affected by temperature difference (temperature unevenness) that occurs in the firing furnace during the production of pre-sintered bodies among a plurality of products.

Moreover, in the method of producing a zirconia sintered body described in Patent Literature 1, the retention time at the highest temperature is set to be 2 hours. Such firing for a prolonged period not only reduces production efficiency, but also increases energy costs. In addition, when a zirconia sintered body is used to produce a dental prosthesis, it is not possible for a patient to receive treatment with a prosthesis on that consultation day, and he/she needs to go to the dentist on another day again for the treatment with the prosthesis. In the meantime, in the zirconia powder as described in Patent Literature 1, when the retention time at the highest temperature is shortened, the sintered body becomes clouded and the translucency thereof declines.

Accordingly, a zirconia composition and pre-sintered body are sought that shortens firing time while maintaining the translucency of the sintered body.

Means to Solve the Problem

According to a first aspect of the present disclosure, a composition is provided, comprises a zirconia powder, in which 55% or more thereof is monoclinic, and a stabilizer capable of suppressing phase transition of zirconia. An average particle diameter of zirconia particles and particles of the stabilizer is 0.06 μm to 0.17 μm. At least a portion of the stabilizer does not form a solid solution with zirconia.

According to a second aspect of the present disclosure, a pre-sintered body is provided, which comprises zirconia in which 55% or more thereof is monoclinic, and a stabilizer capable of suppressing phase transition of zirconia. At least a portion of the stabilizer does not form a solid solution with zirconia.

According to a third aspect of the present disclosure, a pre-sintered body is provided, which is produced by firing a pressed body of the composition according to the first aspect at a temperature of 800° C. to 1200° C.

According to a fourth aspect of the present disclosure, a zirconia pre-sintered body is provided, in which a zirconia powder has not been sintered yet but solidified. The pre-sintered body comprises a stabilizer capable of suppressing phase transition of zirconia When a first translucency and a second translucency are compared, the first translucency is 85% or more of the second translucency. The first translucency is of a first sintered body produced by firing the pre-sintered body for 30 minutes at a temperature of 1550°

C. The second translucency being of a second sintered body produced by firing the pre-sintered body for 120 minutes at a temperature of 1550° C.

According to a fifth aspect of the present disclosure, a method of producing a composition comprises mixing a zirconia powder in which 55% or more thereof is monoclinic and a stabilizer capable of suppressing phase transition of zirconia to produce a mixture. The method comprises no firing the mixture at a temperature of 700° C. or higher.

According to a sixth aspect of the present disclosure, a method of producing a zirconia pre-sintered body is provided, the method comprising a first shaping step of shaping the composition according to the first aspect and/or the fifth aspect to produce a first shaped body, and a pre-sintering step of firing the first shaped body at a temperature not leading to sintering to produce a pre-sintered body.

According to a seventh aspect of the present disclosure, a method of producing a zirconia sintered body is provided, the method comprising a first shaping step of shaping the composition according to the first aspect and/or the fifth aspect to produce a first shaped body, and a sintering step of firing the first shaped body at a temperature allowing sintering or higher to produce a sintered body.

According to an eighth aspect of the present disclosure, a method of producing a zirconia sintered body is provided, the method comprising a sintering step of firing the pre-sintered body according to at least one of the third aspect, the fourth aspect and the sixth aspect at a temperature allowing sintering or higher to produce a sintered body.

Effect of the Invention

According to the present disclosure, variation of the shrinkage factor from the composition to the pre-sintered body, which can be caused by temperature unevenness in the firing furnace, can be suppressed. As such, the yield of the product can be increased and the production efficiency of the product can also be enhanced. In addition, the sintered body can be shaped with a higher accuracy.

According to the present disclosure, a zirconia sintered body with a high translucency can be produced while shortening the manufacturing tune for the sintered body. As such, the production efficiency of the product can be enhanced and the energy costs can also be reduced. When a zirconia sintered body is applied for a dental prosthesis, time burden for a patient(s) can be reduced.

A composition of the present disclosure may have at least one of the advantages mentioned above: suppressing variation of shrinkage factor and shortening manufacturing time.

DESCRIPTION OF THE PREFERRED EMBODIMENT

Figure 1:
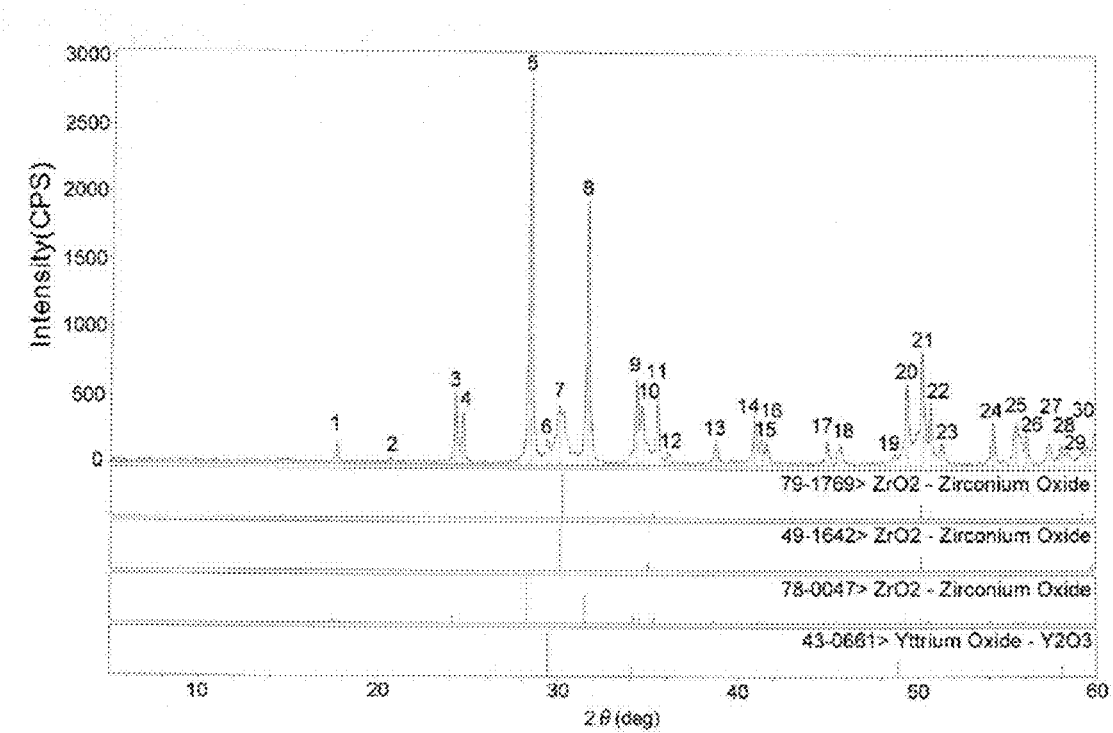
FIG. 1 shows an X-ray diffraction pattern of a pre-sintered body produced in Example 5-2.

In the following, preferred modes from each of the above aspects will be described.

According a preferred mode of the above first aspect, a BET specific surface area is 7.5 m/g to 25 m/g.

According a preferred mode of the above first aspect, 80% or more of zirconia is monoclinic.

According a preferred mode of the above first aspect, the average particle diameter is 0.10 μm to 0.14 μm.

According a preferred mode of the above first aspect, the average particle diameter is less than 0.13 μm.

According a preferred mode of the above first aspect, the stabilizer is yttria.

According a preferred mode of the above first aspect, the composition includes 3 mol % to 7.5 mol % of yttria based on a total amount of moles of zirconia and yttria.

According a preferred mode of the above first aspect, there is a peak of yttria in an X-ray diffraction pattern of the composition.

According a preferred mode of the above first aspect, $f_y$ calculated based on the following expression 1 is 1% or more.

According a preferred mode of the above first aspect, $f_y$, is 15% or less.

According a preferred mode of the above first aspect, a content by percentage of yttria in the composition is 3 mol % or more and less than 4.5 mol %, $f_y$ is 2% or more.

According a preferred mode of the above first aspect, a content by percentage of yttria in the composition is 4.5 mol % or more and less than 5.8 mol %, $f_y$ is 3% or more.

According a preferred mode of the above first aspect, a content by percentage of yttria in the composition is 5.8 mol % or more and 7.5 mol % or less, $f_y$ is 4% or more.

According a preferred mode of the above second aspect, the pre-sintered body has a density of 2.7 g/cm$^3$ to 3.6 g/cm$^3$.

According a preferred mode of the above second aspect, the pre-sintered body has a flexural strength of 15 MPa to 70 MPa.

According a preferred mode of the above second aspect, 80% or more of zirconia is monoclinic.

According a preferred mode of the above second aspect, the stabilizer is yttra.

According a preferred mode of the above second aspect, the composition includes 3 mol % to 7.5 mol % of yttria based on a total amount of moles of zirconia and yttria.

According a preferred mode of the above second aspect, there is a peak of yttria in an X-ray diffraction pattern of the composition.

According a preferred mode of the above second aspect, $f_y$ calculated based on the following expression 1 is 1% or more.

According a preferred mode of the above second aspect, $f_y$ is 15% or less.

According a preferred mode of the above second aspect, a content by percentage of yttria in the composition is 3 mol % or more and less than 4.5 mol %, 4 is 2% or more.

According a preferred mode of the above second aspect, a content by percentage of yttria in the composition is 4.5 mol % or more and less than 5.8 mol %, $f_y$ is 3% or more.

According a preferred mode of the above second aspect, a content by percentage of yttria in the composition is 5.8 mol % or more and 7.5 mol % or less, $f_y$ is 4% or more.

According a preferred mode of the above second aspect, when a first translucency and a second translucency are compared, the first translucency is 85% or more of the second translucency. The first translucency is of a first sintered body produced by firing the pre-sintered body for 30 minutes at a temperature of 1550° C. The second translucency is of a second sintered body produced by firing the pre-sintered body for 120 minutes at a temperature of 1550° C.

According a preferred mode of the above fifth aspect, 95% or more of the zirconia powder in the mixture is monoclinic.

According a preferred mode of the above fifth aspect, in the mixing step, the zirconia powder and the stabilizer which are prepared separately are mixed.

According a preferred mode of the above fifth aspect, the method of producing a composition further comprises pulverizing the mixture such that an average particle diameter thereof is 0.06 µm to 0.17 µm.

According a preferred mode of the above fifth aspect, the average particle diameter is made to be less than 0.13 µm in the pulverization step.

According a preferred mode of the above fifth aspect, the method of producing a composition further comprises drying the mixture by spray drying to make the mixture in a granular form.

According a preferred mode of the above fifth aspect, the method of producing a composition comprises no firing the mixture at a temperature of 700° C. or higher.

According a preferred mode of the above sixth aspect, the first shaped body is fired at a temperature of 800° C. to 1200° C. in the pre-sintering step.

According a preferred mode of the above sixth aspect, the method of producing a pre-sintered body comprises no firing the composition at a temperature of 700° C. or higher prior to the pre-sintering step.

According a preferred mode of the above seventh aspect, the method of producing a zirconia sintered body comprises no firing the composition at a temperature of 700° C. or higher prior to the sintering step.

According a preferred mode of the above seventh aspect, the method of producing a zirconia sintered body further comprises a pre-sintering step of firing the first shaped body at a temperature not leading to sintering to produce a pre-sintered body prior to the sintering step. The pre-sintered body is fired in the sintering step as the first shaped body.

According a preferred mode of the above eighth aspect, the method of producing a zirconia sintered body further comprises a second shaping step of shaping the pre-sintered body to produce a second shaped body prior to the sintering step. The second shaped body is fired in the sintering step as the pre-sintered body.

According a preferred mode of the above eighth aspect, a retention time at a highest firing temperature is 1 hour or shorter in the sintering step.

According a preferred mode of the above eighth aspect, an element of the stabilizer is made to form a solid solution with zirconia in the sintering step.

As a first embodiment, a composition of the present disclosure will be described. The composition may be a precursor (intermediate product) for a zirconia sintered body and pre-sintered body.

The composition contains zirconia powder and a stabilizer capable of suppressing phase transition of zirconia. It is preferred that the stabilizer be capable of forming partially-stabilized zirconia. Examples of the stabilizer may include oxides, such as calcium oxide (CaO), magnesium oxide (MgO), yttria, cerium oxide (CeO$_2$), and scanditun oxide (Sc$_2$O$_3$). The content of the stabilizer in the composition, pre-sintered body and sintered body can be measured via, for example, inductively coupled plasma (ICP) emission spectral analysis, fluorescent X-ray analysis and the like.

In the composition, it is preferred that the stabilizer exist such that at least a portion of the zirconia crystal is monoclinic. It is preferred that at least a portion of the stabilizer does not form a solid solution with zirconia. For example, an X-ray diffraction (XRD) pattern may be used to confirm that a portion of the stabilizer does not form a solid solution with zirconia. In the XRD pattern of the composition, when a peak resulting from the stabilizer is found, this means that the stabilizer exists without forming a solid solution with zircoma in the composition. When the entire amount of the stabilizer forms a solid solution with zirconia, basically, a peak resulting from the stabilizer cannot be found in the XRD pattern. However, depending on conditions, such as crystalline state of the stabilizer, the stabilizer may not form a solid solution with zirconia even when there is no peak of the stabilizer found in the XRD pattern. If the predominant crystal system of zirconia is tetragonal and/or cubic and there is no peak of the stabilizer found in the XRD pattern, then it is believed that the majority, basically all, of the stabilizer forms a solid solution with zircoma.

In the composition of the present disclosure, all of the stabilizer is allowed not to form a solid solution with zirconia.

Note that, in the present disclosure, that the stabilizer forms a solid solution with zirconia refers to, for example, that an element (atom) contained in the stabilizer forms a solid solution with zirconia.

From the viewpoint of strength and translucency of the sintered body produced from the composition of the present disclosure, it is preferred that the stabilizer be yttria. The content by percentage of yttria is preferably 3 mol % or more, more preferably 3.5 mol % or more, and further preferably 4 mol % or more based on the total amount of moles of zirconia and yttria. When the content of yttria is 3 mol % or more, the translucency of the sintered body can be enhanced. In addition, the content by percentage of yttria is preferably 7.5 mol % or less, more preferably 7 mol % or less, more preferably 6.5 mol % or less, and further preferably 6 mol % or less based on the total amount of moles of zirconia and yttria. When the content of yttria is 7.5 mol % or less, it is possible to suppress decline of the strength of the sintered body.

The abundance by percentage of yttria that does not form a solid solution with zirconia (hereinafter referred to as "not-doped yttria (free yttria)") in the composition, $f_y$, can be calculated based on the following Expression 1. The abundance $f_y$ of not-doped yttria is preferably greater than 0%, more preferably 1% or more, more preferably 2% or more, and further preferably 3% or more. The upper limit of the abundance $f_y$ of not-doped yttria depends on the content of yttria in the composition. When the content of yttria is 7.5 mol % or less based on the total amount of moles of zirconia and yttria, $f_y$ can be 15% or less. For example, when the content of yttria is 3.5 mol % to 4.5 mol %, $f_y$ can be 7% or less. When the content of yttria is 5 mol % to 6 mol %, $f_y$ can be 10% or less. When the content of yttria is 5.5 mol % to 6.5 mol %, $f_y$ can be 11% or less.

When the content by percentage of yttria is 3 mol % or more and less than 4.5 mol % in the composition, $f_y$ is preferably 2% or more, more preferably 3% or more, more preferably 4% or more, and further preferably 5% or more. When the content of yttria is 4.5 mol % or more and less than 5.8 mol %, $f_y$ is preferably 3% or more, more preferably 4% or more, more preferably 5% or more, more preferably 6% or more, and further preferably 7% or more. When the content of yttria is 5.8 mol % or more and 7.5 mol % or less, $f_y$ is preferably 4% or more, more preferably 5% or more, more preferably 6% or more, more preferably 7% or more, and further preferably 8% or more.

$$f_y(\%) = \frac{I_y(111)}{I_y(111)+I_m(111)+I_m(11-1)+I_t(111)+I_c(111)} \times 100 \quad \text{[Expression 1]}$$

In Expression 1, $I_y$ (111) represents a peak intensity of plane (111) of yttria in the vicinity of 2θ=29° in an XRD pattern using CuKα radiation. $I_m$ (111) and $I_m$ (11-1) represent peak intensities of plane (111) and plane (11-1) of monoclinic zirconia, respectively. $I_t$ (111) represents a peak intensity of plane (111) of tetragonal zirconia. $I_c$ (111) represents a peak intensity of plane (111) of cubic zirconia.

Expression 1 described above can also be applied to calculation of the abundance of a not-doped stabilizer other than yttria, by substituting another peak instead of $I_y$ (111).

It is preferred that the predominant crystal system of zirconia in the composition be monoclinic. In the composition, the percentage of monoclinic system in zirconia, $f_m$, is preferably 20% or more, preferably 30% or more, preferably 40% or more, preferably 50% or more, preferably 55% or more, preferably 60% or more, more preferably 70% or more, more preferably 80% or more, more preferably 85% or more, more preferably 90% or more, and further preferably 95% or more based on the total amount of monoclinic system, tetragonal system and cubic system. The percentage of monoclinic system $f_m$ can be calculated from the following Expression 2, based on an XRD peak using CuKα radiation. The meaning of each symbol in Expression 2 is the same as in Expression 1. The predominant crystal system in the composition possibly contributes to elevation of the shrinkage temperature and shortening of sintering time.

In the composition of the present disclosure, the peaks of tetragonal and cubic crystals are allowed not to be detected substantially. That is, the percentage of monoclinic system $f_m$ may be 100%.

$$f_m(\%) = \frac{I_m(111)+I_m(11-1)}{I_m(111)+I_m(11-1)+I_t(111)+I_c(111)} \times 100 \quad \text{[Expression 2]}$$

When a pressed body of the composition is fired at 800° C. or higher and 1000° C. or lower to produce a pre-sintered body, it is preferred that a shrinkage factor from the pressed body to the pre-sintered body be 1% or less relative to the unidirectional dimension of the pressed body. In addition, when a pressed body of the composition is fired at higher than 1000° C. and 1200° C. or lower to produce a pre-sintered body, it is preferred that a shrinkage factor from the pressed body to the pre-sintered body be 5% or less relative to the unidirectional dimension of the pressed body. Note that the pressed body here is made by pressing zirconia powder with a pressure of 300 kg/cm² to produce a molded body and then further by subjecting the molded body to the CIP process at 1700 kg/cm².

The composition can be in the form of powder. Powder may be a mass of granules. A granule is formed of aggregated primary particles and/or secondary particles which are formed of aggregated primary particles.

The granule is a mass (aggregate) of particles. When the composition takes the form of a granule, in order to distinguish a particle from a granule, the expressions "particle" and "particle constituting a granule" will be used hereinafter. The composition of the present disclosure is allowed not to be in the form of a granule. When the composition does not take the form of a granule, a "particle constituting a granule" refers to a particle in the powder. The "particle constituting a granule" includes a zirconia particle and a stabilizer particle.

In the present disclosure, a "primary particle" refers to a globe-shaped particle, which is the minimum unit. For example, a primary particle refers to a globe-shaped body that does not bind to another particle and appears to be in a separable condition, when observed by an electron microscope. In the present disclosure, a "secondary particle" refers to a particle in a condition where particles that appear to be primary particles in an electron microscope aggregate. The secondary particle includes an aggregate in which primary particles are attached in a breakable manner, as well as an aggregate that appears to be one particle in which primary particles are fused and attached one another in an inseparable manner. In many cases, in an electric microscope image, the secondary particle is not a globe-shaped body and has a distorted shape.

It is preferred that particles constituting a granule be predominantly primary particles. For example, in the visual checking of an electron microscope image, it is preferred that the number of primary particles be bigger than the number of secondary particles. For example, in the visual checking of an electron microscope image, it is preferred that 50% or more, preferably 70% or more, and more preferably 80% or more of primary particles out of the primary particles (including primary particles constituting secondary particles) be particles not constituting secondary particles. Since secondary particles normally have irregular shapes, when the number of secondary particles gets bigger, the circularity of the granule, mentioned below, will become lower.

The average particle diameter of the particles constituting a granule is preferably 0.06 µm or greater, more preferably 0.08 µm or greater, more preferably 0.10 µm or greater, and further preferably 0.11 µm or greater, as measured via laser diffraction/scattering particle size distribution measuring method. When the average particle diameter is less than 0.06 pu, the sintering may be difficult, or even if the sintering becomes possible, the sintered body may become clouded. In addition, the average particle diameter is preferably 0.17 µm or smaller, more preferably 0.15 µm or smaller, more preferably 0.14 µm or smaller, and further preferably 0.13 µm or smaller. When the average particle diameter exceeds 0.17 µm, the rate change temperature, mentioned below, gets higher, thereby making the composition susceptible to the temperature unevenness in the firing furnace. In addition, when the firing time for sintering is shortened, the translucency of the sintered body declines. The average particle diameter herein means a particle diameter measured with no distinction between primary particles and secondary particles.

When particles or granules are made without undergoing the firing step, in order to further enhance the translucency of the sintered body produced from the particles or granules, the average particle diameter of the particles constituting a granule is more preferably less than 0.13 μm, more preferably 0.125 μm or smaller, more preferably 0.12 μm or smaller, and further preferably 0.115 μm or smaller.

The BET specific surface area of the particles constituting a granule is, when measured in accordance with JIS Z8830 (2013), preferably 7.0 m$^2$/g or more, more preferably 7.5 m$^2$/g or more, and further preferably 8 m$^2$/g or more. When the BET specific surface area is less than 7.0 m/g, the sintering may be difficult, or even if the sintering becomes possible, the sintered body may become clouded. In addition, the BET specific surface area is preferably 30 m$^2$/g or less, more preferably 25 m$^2$/g or less, and further preferably 20 m$^2$/g or less. When the BET specific surface area exceeds 30 m$^2$/g, the rate change temperature, mentioned below, gets higher, thereby making the composition susceptible to the temperature unevenness in the firing furnace. In addition, when the firing time for sintering is shortened, the translucency of the sintered body declines. The BET specific surface area herein means a specific surface area measured with no distinction between primary particles and secondary particles.

Among zirconia in the zirconia composition, 50% or more, preferably 70% or more, more preferably 80% or more, and further preferably 90% or more of zirconia can take the form of a granule.

When the zirconia composition of the present disclosure does not take the form of a granule, the zirconia particles constituting the powder may have the average particle diameter and the BET specific surface area mentioned above.

The average particle diameter of the granule in the zirconia composition is preferably 10 μm or greater, more preferably 12 μm or greater, and further preferably 14 μm or greater. If the average particle diameter of the granule is less than 10 μm, the air is involved in the granules when the granules are put into a mold, and thus there is a possibility of insufficient degassing upon shaping, thereby not being able to produce a uniform and compact shaped body. Moreover, there is a possibility that the granules are emitted from a gap upon shaping, thereby producing a shaped body that does not satisfy a predetermined, required amount. The average particle diameter of the granule is preferably 200 μm or smaller, more preferably 190 μm or smaller, more preferably 180 μm or smaller, more preferably 150 μm or smaller, and further preferably 100 μm or smaller. When the average particle diameter of the granule exceeds 200 μm, cavities are formed readily inside the granule. In addition, when granules are placed into the mold, gaps are likely to occur. Due to these phenomena, there is a possibility of insufficient degassing upon shaping, thereby not being able to produce a compact shaped body. There is also a possibility that shrinkage proceeds too much upon shaping, thereby not being able to produce a shaped body having a desired size. Among zirconia in the zirconia composition, it is preferred that 50% or more of zirconia constitutes granules. It is preferred that the average particle diameter of the granule be measured by a method in which granules are not destroyed. For example, the average particle diameter of the granule can be measured via oscillating type and ro-tap type particle size distribution measuring method or acoustic wave vibration sieving type particle size distribution measuring method (for example, with the use of Robot Sifter from SEISHIN ENTERPRISE Co., Ltd.).

It is preferred that the sphericity of the granule be high. By increasing the sphericity of the granule, when zirconia powders having different compositions are layered, mixing at the interface between layers can be brought about. Moreover, when zirconia powder is filled in a mold to produce a shaped body, those having a higher sphericity can increase the filling density even with the same average particle diameter. By increasing the filling density, the strength and the translucency of the sintered body can be enhanced. In addition, even if the mold has a corner part, the filling property of the granule to the corner part can also be enhanced.

The sphericity of the granule can be expressed with, for example, circularity based on a projected image, angle of repose, untamped density, tamped density, etc.

The average circularity based on a projected image of the granule in the zirconia composition is preferably 0.81 or higher, more preferably 0.85 or higher, more preferably 0.90 or higher, and further preferably 0.95 or higher. The circularity can be calculated as a ratio of the perimeter of the circle that has the same area as the granule, in terms of its projected image, to the perimeter of the granule. That is, the circularity can be calculated from the following equation. It is preferred that the average circularity be the average value of circularities of 10,000 or more granules.

Circularity=(perimeter(circumference) of circle having the same area as granule)/perimeter of granule The angle of repose of the zircoma composition is preferably 35° or less, more preferably 32° or less, more preferably 28° or less, more preferably 26° or less, and further preferably 24° or less. The angle of repose can be measured in accordance with JIS R9301-2-2.

The untamped density of the zirconia composition is preferably 1.0 g/cm$^3$ or higher, more preferably 1.1 g/cm$^3$ or higher, more preferably 1.2 g/cm$^3$ or higher, and further preferably 1.3 g/cm$^3$ or higher. The untamped density can be measured in accordance with JIS R9301-2-3.

The tamped density of the zirconia composition is preferably 1.3 g/cm$^3$ or higher, more preferably 1.4 g/cm or higher, and further preferably 1.5 g/cm$^3$ or higher. The tamped density can be measured in accordance with JIS R9301-2-3.

The composition may contain additives other than zirconia and yttria. Examples of additives may include pigments (including coloring agents and fluorescent agents), binders, dispersing agents, anti-foaming agents, alumina (Al$_2$O$_3$), titanium oxide (TiO$_2$), silica (SiO$_2$), and the like.

Examples of additives, such as coloring agents, may include oxides of at least one element selected from the group of Ti, V, Cr, Mn, Fe, Co. Ni, Zn, Y, Zr, Sn, Sb, Bi, Ce, Pr, Sm, Eu, Gd, Tb, and Er. Examples of fluorescent agents may include Y$_2$SiO$_5$:Ce, Y$_2$SiO$_5$:Tb, (Y,Gd,Eu)BO$_3$, Y$_2$O$_3$:Eu, YAG:Ce, ZnGa$_2$O$_4$:Zn, BaMgAl$_{10}$O$_{17}$:Eu, and the like.

As binders, organic binders can be used. For example, acrylic-based, acrylate-based, paraffin-based, fatty acid-based, and polyvinyl alcohol-based binders can be used.

The composition of the present disclosure may be in a dried form, or may be in a form including liquid or a form included in liquid. For example, the composition can take a form, such as powder, paste, or slurry. In addition, the composition may be a shaped body having a predetermined shape (hereinafter, referred to as a "first shaped body (first molding).")

The density of the first shaped body is preferably 2.75 g/cm$^3$ or higher, more preferably 2.80 g/cm$^3$ or higher, more preferably 2.85 g/cm$^3$ or higher, more preferably 2.90 g/cm$^3$ or higher, and further preferably 3.00 g/cm$^3$ or higher. The density can be calculated as (the mass of the first shaped body)/(the volume of the first shaped body), for example.

In general, the shrinkage rate from the pressed body to the sintered body is not consistent over firing temperatures, and it is low until a certain temperature, but becomes high at the certain temperature. In this description, the temperature at which the shrinkage rate changes is expressed as a "rate change temperature." According to the composition of the present disclosure, the rate change temperature can be 1050° C. or higher, and preferably 1100° C. or higher, the rate change temperature can be determined by creating a plot of the shrinkage factor relative to the highest firing temperature, as in Examples mentioned below.

When a plurality of pressed bodies are fired in one firing furnace at the same time to produce a plurality of pre-sintered bodies (block-shaped bodies) as one lot, it is preferred that the variation of shrinkage factors to the pre-sintered body be small among the plurality of pressed bodies. This is because, if the variation of shrinkage factors is wide, when the same coefficient is applied to the lot to determine the dimension of the shaping processed bodies upon shaping processing the pre-sintered bodies, sintered bodies not having the dimension of interest are obtained. This is particularly problematic in the case of products that require dimensional accuracy at a high level, such as dental prostheses. As such, in one lot, block-shaped bodies with the shrinkage factor departing from the permissible range cannot be used as a product, thereby decreasing the yield.

According to the composition of the present disclosure, the variation of shrinkage factors in one lot can be made small at a firing temperature (for example, about 1000° C.) for producing pre-sintered body blocks. Normally, the highest firing temperature for producing the pre-sintered body (hereinafter, referred to as "pre-sintering temperature") is close to the rate change temperature. In general, at the pre-sintering temperature, the temperature difference (temperature unevenness) of approximately 20° C. to 50° C. occurs in the firing furnace. As such, when the rate change temperature is near the pre-sintering temperature, the lot of the composition is strongly affected by this temperature unevenness. That is, in one lot, there is a big difference in the shrinkage factor between pre-sintered bodies placed at locations with a lower temperature and pre-sintered bodies placed at locations with higher temperature. Pre-sintered bodies with the shrinkage factor departing from the permissible range are not allowed to be a product, and the yield thus declines. On the other hand, according to the composition of the present disclosure, the difference between the rate change temperature and the pre-sintering temperature can be made small since its rate change temperature is high. As such, in one lot, the difference in the shrinkage factor between pre-sintered bodies placed at locations with a lower temperature and pre-sintered bodies placed at locations with higher temperature can be made small. As a result, the number of pre-sintered bodies with the shrinkage factor departing from the permissible range can be lowered, thereby increasing the yield. In addition, it is possible to increase the number of products that can be fired at one time, and therefore, the production efficiency can be enhanced. Furthermore, according to the composition and pre-sintered body of the present disclosure, a final product (sintered body) with a high dimensional accuracy can be produced even with any block body in one lot. The composition and pre-sintered body of the present disclosure are useful for the production of, in particular, products that require dimensional accuracy at a high level (for example, dental prostheses).

The composition and pre-sintered body of the present disclosure have another advantage. According to the composition and pre-sintered body of the present disclosure, without decreasing the translucency and strength of the produced zirconia sintered body, the firing time for producing the sintered body can be shortened. In particular, the retention time at the highest firing temperature for producing the sintered body (hereinafter, referred to as "sintering temperature") can be shortened (short time sintering). As such, the production efficiency can be enhanced and the production costs can also be reduced. In addition, when the composition and pre-sintered body of the present disclosure are applied for dental products, the time from determination of the dimensions of the dental product to be used for treatment until that dental product becomes available for the treatment can be shortened, thereby alleviating the time burden for the patient.

The composition according to the first embodiment may have at least one of the advantages with regard to rate change temperature and short time sintering, mentioned above. It is preferred that the composition according to the first embodiment have both advantages with regard to rate change temperature and short time sintering.

As a second embodiment, a method of producing the composition of the present disclosure will be described.

At first, zirconia and the stabilizer are mixed at a predetermined ratio to produce a mixture (mixing step). For example, when the stabilizer is yttria, the mixing ratio can be the same as the content of yttria described above. The mixing may be performed via dry mixing or wet mixing. The composition can be pulverized until the average particle diameter and/or BET specific surface area mentioned above are achieved (first pulverization step). The mixing step and the first pulverization step can be performed as the same step. Pulverization can be performed by, for example, dispersing the composition in a solvent, such as water (dispersion step), and subsequently using a ball mill. When the firing step and the following steps mentioned below are not performed, the composition is pulverized such that the average particle diameter thereof is, for example, 0.10 µm to 0.14 µm, for elevation of the rate change temperature and/or short time sintering. The average particle diameter can be measured via laser diffraction/scattering particle size distribution measuring method. After the mixing step and/or the first pulverization step, the composition can be shaped into the form of a granule as mentioned above by drying the mixture via, for example, spray drying using a spray dryer (first drying step). As such, the composition of the present disclosure can be produced.

When the firing step and the following steps mentioned below are not performed, in the first pulverization step, the average particle diameter of the composition is made to be preferably less than 0.13 µm, more preferably 0.125 µm or less, more preferably 0.12 µm or less, and further preferably 0.115 µm or less. The average particle diameter of the composition of less than 0.13 µm can enhance the translucency of the sintered body.

When the firing step and the following steps mentioned below are not performed, it is preferred that a step of firing the composition at 700° C. or higher be not included prior to the step of producing the pre-sintered body and sintered body mentioned below. As such, production steps can be simplified, and forming a solid solution of the stabilizer with zirconia before sintering can also be suppressed.

It is preferred that zirconia and the stabilizer be prepared separately. For example, it is preferred that zirconia and the stabilizer be not deposited at the same time (in the same step), but that a step of preparing zirconia (for example, production step) and a step of preparing the stabilizer (for example, production step) be separate steps independent of each other. As such, the stabilizer can also be prevented from forming a solid solution with zirconia in a production step for the pre-sintered body mentioned below.

The following steps can be optionally conducted depending on the utilization purpose of the composition. For example, after any step of the steps mentioned above, the mixture and/or the composition may be fired (firing (calcination) step). As mentioned above, it is preferred that firing conditions be those such that the predominant crystal system of zirconia when cooling after firing does not become tetragonal and cubic crystals. In addition, it is preferred that the firing conditions be those such that at least a portion of the stabilizer does not form a solid solution with zirconia. For example, the firing temperature is preferably 700° C. or higher and more preferably 800° C. or higher. In addition, the firing temperature is preferably 1100° C. or lower, more preferably 1000° C. or lower, more preferably 980° C. or lower, and further preferably 950° C. or lower. Firing may be performed under the atmospheric air. By performing the firing step, it is believed that a portion of the stabilizer can form a solid solution with zirconia, that the stabilizer can be made easy to form a solid solution with zirconia in the sintering step, or that properties of the sintered body can be improved.

After any step of the steps mentioned above, the composition may be dispersed in a solvent, such as water, to produce slurry, and additives, such as binders or pigments, may be added to the composition (addition step). The composition may be pulverized until the average particle diameter and/or BET specific surface area mentioned above are achieved (second pulverization step). The addition step and the second pulverization step may be performed as the same step. The second pulverization step may be performed in the same manner as the first pulverization step. After the addition step and/or the second pulverization step, the composition may be shaped into the form of a granule as mentioned above by drying the mixture via, for example, spray drying using a spray dryer (second drying step).

The composition may be shaped into a first shaped body (first molding) (first shaping step). Shaping methods are not limited to particular methods, and suitable methods may be appropriately selected depending on the purpose. For example, the composition may be shaped via methods, such as pressing, injection molding, and laser beam lithography. Alternatively, multi-stage shaping may be performed. For example, the composition may be press-shaped, and then, further subjected to CIP process.

The additives mentioned above may be appropriately added in any step.

Based on the method of producing the composition according to the second embodiment, the composition according to the first embodiment can be produced. That is, based on the method of producing the composition according to the second embodiment, the composition that has a high rate change temperature and/or that can shorten the firing time for sintering, as mentioned above, can be produced.

Zirconia powder with which yttria forms a solid solution is typically produced via coprecipitation method and hydrolysis method. In the coprecipitation method and hydrolysis method, a mixture of hydrous zirconia and yttria is produced from zirconium oxychloride and yttrium chloride in the same step, and the mixture is fired at 800° C. to 900° C. to produce stabilized zirconia powder with which yttria (yttrium) forms a solid solution. This yttria-doped zirconia is predominantly tetragonal crystal and/or cubic crystal. The particle diameter of zirconia powder obtained from the above is at a size level of several decades nm. In order to make this zirconia powder a raw material for a zirconia sintered body, the fired object is pulverized to a certain particle diameter and is then granulated to produce a composition.

The composition as produced by such a coprecipitation method or hydrolysis method has a high temperature dependence of the shrinkage factor at a temperature range for producing a pre-sintered body. In addition, when the firing time is short, it is not possible to obtain a sintered body with a sufficient translucency.

In the production method of the present disclosure, after producing zirconia (monoclinic), a stabilizer (yttria) is additionally mixed, and the stabilizer forms a solid solution with zirconia basically in a sintering step. As such, the temperature dependence of the shrinkage factor at the temperature range for producing the pre-sintered body can be lowered. In addition, a sintered body with a high translucency can be obtained even by sintering for a short time.

Moreover, in the production method of the present disclosure, when the firing step, the second pulverization step and the second drying step are not performed, the production costs of the composition can be cut down due to major time reduction. In addition, by appropriating facilities and time, by which the second pulverization step and the second drying step are performed, for the first pulverization step and the first drying step, the quantity of production per time can be doubled. Furthermore, by omitting the second pulverization step and the second drying step, occasions to contaminating the composition with impurities, such as wastes, can be reduced.

As a third embodiment, a zirconia pre-sintered body of the present disclosure will be described. The pre-sintered body may be a precursor (intermediate product) for a zirconia sintered body. In the present disclosure, the pre-sintered body can refer to, for example, those in which zirconia particles (powder) are formed into a block without being fully sintered. In particular, the pre-sintered body of the present disclosure refers to those produced from the composition of the present disclosure. It is preferred that the density of the pre-sintered body be 2.7 g/cm$^3$ or higher. In addition, the density of the pre-sintered body is preferably 4.0 g/cm$^3$ or lower, more preferably 3.8 g/cm$^3$ or lower, and further preferably 3.6 g/cm$^3$ or lower. When the density is within such a range, shaping process can be performed easily.

The content ratio of zirconia and the stabilizer in the pre-sintered body is the same as that in the composition before producing the pre-sintered body. From the viewpoint of strength and translucency of the sintered body produced from the pre-sintered body of the present disclosure, it is preferred that the stabilizer be yttria.

The percentage of not-doped stabilizer in the pre-sintered body depends on a firing temperature upon production of the pre-sintered body, but it is believed to be not more than the percentage of not-doped stabilizer in the composition before producing the pre-sintered body. The abundance of not-doped yttra in the pre-sintered body, $f_y$, can be calculated based on Expression 1 described above. The abundance of not-doped yttria in the pre-sintered body, $f_y$, can be the same as $f_y$ of the composition mentioned above.

In the pre-sintered body, the abundance of not-doped yttria, $f_y$, is preferably greater than 0%, more preferably 1% or greater, more preferably 2% or greater, and further preferably 3% or greater. The upper limit of the abundance of not-doped yttria, $f_y$, depends on the content by percentage of yttria in the pre-sintered body. When the content of yttria is 7.5 mol % or less based on the total amount of moles of zirconia and yttria, $f_y$ may be 15% or lower. For example, when the content of yttria is 3.5 mol % to 4.5 mol %, $f_y$ may be 7% or lower. When the content of yttria is 5 mol % to 6 mol %, $f_y$ may be 10% or lower. When the content of yttria is 5.5 mol % to 6.5 mol %, $f_y$ may be 11% or lower.

In the pre-sintered body, when the content of yttria is 3 mol % or more and less than 4.5 mol %, $f_y$ is preferably 2% or greater, more preferably 3% or greater, more preferably 4% or greater, and further preferably 5% or greater. When the content of yttria is 4.5 mol % or more and less than 5.8 mol %, $f_y$ is preferably 3% or greater, more preferably 4% or greater, more preferably 5% or greater, more preferably 6% or greater, and further preferably 7% or greater. When the content of yttria is 5.8 mol % or more and 7.5 mol % or less, $f_y$ is preferably 4% or greater, more preferably 5% or greater, more preferably 6% or greater, more preferably 7% or greater, and further preferably 8% or greater.

The crystal system of zirconia in the pre-sintered body depends on a firing temperature upon production of the pre-sintered body, but it is believed that the content ratio of monoclinic crystal is not more than the content ratio of monoclinic crystal in the composition before producing the pre-sintered body. The percentage of monoclinic system in zirconia, $f_m$, is preferably 60% or greater, more preferably 70% or greater, more preferably 80% or greater, more preferably 90% or greater, and further preferably 95% or greater based on the total amount of monoclinic system, tetragonal system and cubic system.

The flexural strength of the pre-sintered body measured in accordance with JIS R1601 is preferably 15 MPa or greater in order to ensure a strength that allows mechanical process. In addition, the flexural strength of the pre-sintered body is preferably 70 MPa or lower and more preferably 60 MPa or lower in order to facilitate mechanical process.

The flexural strength may also be measured in accordance with ISO 6872.

However, the size of the test piece is changed from the provision in JIS R1601 or ISO 6872 to be 5 mm×10 mm×50 mm. The surfaces and C plane of the test piece are subjected to surface finishing in the longitudinal direction using #600 sandpaper. The test piece is placed such that its broadest surface faces the vertical direction (loading direction). In the flexural test measurement, the span is 30 mm and the cross head speed is 0.5 mm/min.

The pre-sintered body may contain additives mentioned above.

The pre-sintered body may be a shaped body (molding) having a predetermined shape (hereinafter, referred to as a "second shaped body (second molding).") For example, the pre-sintered body may have a disc (circular plate) shape, rectangular parallelepiped shape, or shape of a dental product (for example, shape of a tooth crown). The pre-sintered body also includes dental products formed by processing a pre-sintered zirconia disc using a CAD/CAM (Computer-Aided Design/Computer-Aided Manufacturing) system (for example, prostheses with a shape of a tooth crown).

The pre-sintered body according to the third embodiment is produced in such a way that the variation of the shrinkage factor from the composition is small. As such, based on the pre-sintered body according to the third embodiment, the shrinkage factor from the pre-sintered body to the sintered body can be made even, thereby producing a sintered body with a high dimensional accuracy.

Based on the pre-sintered body according to the third embodiment, as mentioned above, a sintered body with a high transparency can be produced even by firing for a short time. As such, the pre-sintered body according to the third embodiment has the advantage mentioned above with regard to short time sintering.

A sintered body produced by firing the pre-sintered body for 30 minutes at a temperature of 1550° C. is called a first sintered body. A sintered body produced by firing the pre-sintered body for 120 minutes at a temperature of 1550° C. is called a second sintered body. When the translucency of the first sintered body and the second sintered body (see description below) are compared, the translucency of the first sintered body is preferably 85% or higher, more preferably 90% or higher, more preferably 95% or higher relative to the translucency of the second sintered body, and further preferably substantially equivalent to the translucency of the second sintered body.

The pre-sintered body according to the third embodiment has at least one of the advantages with regard to dimensional accuracy and short time sintering, mentioned above, and preferably has both advantages.

Next, as a fourth embodiment, a method of producing the pre-sintered body of the present disclosure will be described.

The pre-sintered body of the present disclosure can be produced by firing the first shaped body produced in the first shaping step described above at a temperature not leading to sintering of zirconia particles (that is, pre-sintering) (pre-sintering step). In order to ensure shaping into a block, the firing temperature is, for example, preferably 800° C. or higher, more preferably 900° C. or higher, and further preferably 950° C. or higher. In addition, in order to enhance dimensional accuracy, the firing temperature is, for example, preferably 1200° C. or lower, more preferably 1150° C. or lower, and further preferably 1100° C. or lower.

It is believed that such a firing temperature does not advance forming a solid solution of the stabilizer.

The pre-sintered body can be shaped into a second shaped body (second molding)(second shaping step). Shaping methods are not limited to particular methods, and suitable methods can be appropriately selected depending on the purpose. For example, the second shaped body can be produced by subjecting a zirconia disc, which is also a pre-sintered body, to cutting process using a CAD/CAM system and making it into a shape of a dental product (for example, prosthesis with a shape of tooth crown).

Based on the method of producing the pre-sintered body according to the fourth embodiment, the pre-sintered body according to the third embodiment can be produced. According to the fourth embodiment, a pre-sintered body with a small variation of the shrinkage factor can be produced and/or a pre-sintered body that can be sintered in a short time can be produced.

As a fifth embodiment, a sintered body of the present disclosure will be described. In the present disclosure, the sintered body can refer to, for example, those in which zirconia particles (powder) have reached a sintered state. In particular, the sintered body of the present disclosure refers to those produced from the composition and/or pre-sintered body of the present disclosure. It is preferred that the relative density of the sintered body be 99.5% or more. The relative density can be calculated as the percentage of the measured density measured via Archimedes method to the theoretical density.

The zirconia sintered body of the present disclosure includes not only a sintered body formed by sintering shaped zirconia particles under ordinary pressure or without pressurization, but also a sintered body compacted by high temperature pressurization process, such as hot isostatic pressing (HIP) process.

The content ratio of zirconia and the stabilizer in the sintered body is the same as that of the composition and/or pre-sintered body before producing the sintered body. As for the crystal system of zirconia in the sintered body, the percentage of monoclinic system, $f_m$, is preferably 10% or lower, more preferably 5% or lower, and further preferably it is not contained substantially (0%). Crystal systems other than monoclinic system are tetragonal crystal and/or cubic crystal.

As for the percentage of the stabilizer which forms a solid solution in the sintered body, it is preferred that 95% or more of the contained stabilizer form a solid solution with zirconia, and it is more preferred that substantially all of the stabilizer form a solid solution. The abundance of not-doped yttria, $f_y$, is preferably 5% or lower, more preferably 1% or lower, and further preferably substantially all yttria form a solid solution (0%).

The translucency of the sintered body is preferably 12 or higher, more preferably 14 or higher, more preferably 15 or higher, and further preferably 16 or higher. The translucency herein means a value obtained by subtracting a second L* value from a first L* value, wherein, regarding the L* value of lightness (color space) in L*a*b* color system (JIS Z8781), the first L* value is a U value measured for a sample with a thickness of 1.2 mm underlaid by white color, and the second L* value is a L* value measured for the same sample as that for measurement of the first L* value, underlaid by black color. As for a method of producing the sample, at first, granules (composition) can be subjected to press shaping, followed by CIP shaping, such that the thickness of the sintered body is 1.2 mm, to produce, for example, a circular plate shaped body with a diameter of 19 mm. Next, the shaped body can be fired under predetermined firing conditions to produce a sintered body with a thickness of 1.2 mm, which is used as the sample. For the measurement of the L* value, L* values with black color background and white color background can be measured by applying contact liquid to the surface of the sample and subsequently using a spectrophotometer (for example, CE100, analytical software Crystaleye (manufactured by Olympus Corporation)). As the contact liquid, for example, those having a refractive index nD, measured at a measurement wavelength of 589 nm (sodium D line), of 1.60 can be used.

The sintered body may contain additives mentioned above.

The sintered body may be a shaped body having a predetermined shape (hereinafter, referred to as a "third shaped body."). For example, the sintered body may have a disc (circular plate) shape, rectangular parallelepiped shape, or shape of a dental product (for example, shape of a tooth crown).

Next, as a sixth embodiment, a method of producing the sintered body of the present disclosure will be described.

The sintered body of the present disclosure can be produced by firing the composition (including the first shaped body) and/or the pre-sintered body (including the second shaped body) of the present disclosure at a temperature leading to sintering of zirconia particles (sintering step). The firing temperature is, for example, preferably 1400° C. or higher and more preferably 1450° C. or higher. In addition, the firing temperature is, for example, preferably 1650° C. or lower and more preferably 1600° C. or lower. It is preferred that the temperature rising rate and the temperature dropping rate be 300° C./min or less.

In the sintering step, the retention time at a temperature allowing sintering (for example, the highest firing temperature) is preferably shorter than 120 minutes, more preferably 90 minutes or shorter, more preferably 75 minutes or shorter, more preferably 60 minutes or shorter, more preferably 45 minutes or shorter, and further preferably 30 minutes or shorter. The retention time is preferably 1 minute or longer, more preferably 5 minutes or longer, and further preferably 10 minutes or longer. According to the production method of the present disclosure, even such a firing time can suppress decline in the translucency of the sintered body to be produced. In addition, by shortening the firing time, the production efficiency can be enhanced and the energy costs can also be reduced.

In the sintering step, the retention time at a temperature allowing sintering (for example, the highest firing temperature) can also be, for example, 25 minutes or shorter, 20 minutes or shorter, or 15 minutes or shorter.

It is preferred that the temperature rising rate and the temperature dropping rate in the sintering step be set such that the time required for the sintering step is short. For example, the temperature rising rate can be set such that the highest firing temperature is reached in the shortest time depending on capacity of the firing furnace. The temperature rising rate to the highest temperature can be, for example, 10° C./min or more, 50° C./min or more, 100° C./min or more, 120° C./min or more, 150° C./min or more, or 200° C./min or more. It is preferred that the temperature dropping rate be set as a rate that does not cause defects, such as cracks, in the sintered body. For example, after heating is completed, the sintered body can be allowed to cool at room temperature.

In the production method of the present disclosure, it is believed that the stabilizer (for example, yttria) forms a solid solution with zirconia in the sintering step.

The sintered body can be shaped into a third shaped body (third shaping step). Shaping methods are not limited to particular methods, and suitable methods can be appropriately selected depending on the purpose. For example, the third shaped body can be produced by subjecting a zirconia block, which is also a sintered body, to cutting process using a CAD/CAM system and making it into a shape of a dental product (for example, prosthesis with a shape of tooth crown).

As a seventh embodiment, a dental product of the present disclosure will be described. The dental product of the present disclosure comprises the zirconia sintered body according to the fifth embodiment. The zirconia sintered body may have, for example, a shape of a tooth crown. The dental product may further comprise a porcelain material layered on the zirconia sintered body. The porcelain material can be ceramics, such as a glass material. Examples of the dental product may include prostheses (for example, ceramic frame, full contour crown), orthodontic products (for example, orthodontic bracket), dental implant products (for example, dental implant abutment).

Next, as an eighth embodiment, a method of producing the dental product of the present disclosure will be described. The dental product can be produced by sintering the composition (including the first shaped body) and/or the pre-sintered body (including the second shaped body) of the present disclosure, having a predetermined shape. Alternatively, the dental product can be produced by subjecting the sintered body of the present disclosure to cutting process (including the third shaped body).

A dental product having a porcelain material can be produced by, for example, a step of applying a slurry containing the porcelain material onto the sintered body, and a step of firing the sintered body onto which the porcelain material has been applied, to baking the porcelain material on the sintered body.

According to the fifth to eighth embodiments, a sintered body and a dental product with a high dimensional accuracy can be obtained, and/or a sintered body and a dental product with a high translucency can be produced in a short time.

Regarding to structures and characteristics of the composition, pre-sintered body, sintered body and layered body, other than those described in this document, it is believed that it is impossible or utterly impractical to directly define them based on analysis or the like at the time the present application was filed. As such, it is believed that when the structures and characteristics other than those described in this document are defined, definition by a production method is useful.

Examples of the present disclosure will be described below. The present invention is not limited to the following Examples.

EXAMPLES

Examples 1 to 4 and Comparative Examples 1 to 3

[Production of Composition and XRD Measurement]

A zirconia composition of the present disclosure was produced, and crystal systems of zirconia and the degree to which a stabilizer does not form a solid solution with zirconia were confirmed. The results are shown in Table 1.

Yttria was used as a stabilizer. For each of Examples 1 to 3, the additive rate of yttria was altered. In Example 4, the percentage of monoclinic crystal was altered. The additive rate of yttria shown in Table 1 is the percentage of yttria based on the total amount of moles of zirconia and yttria. Step in Table 1 indicates that compositions were obtained through respective steps described below. For $f_y$ indicating the abundance of not-doped yttria, it was calculated based on Expression 1 described above. For $f_m$ indicating the percentage of monoclinic crystal in zirconia, it was calculated based on Expression 2 described above.

A method of producing compositions according to Examples 1 to 3 shown in Table 1 will be described. At first, yttria was added to zirconium oxide of monoclinic crystal to produce a mixture (mixing step). The zirconium oxide and the yttria were produced in steps independent of each other. Next, the mixture was added to water to produce slurry, and then wet pulverized and mixed using a ball mill until the average particle diameter reached 0.13 μm (primary pulverization step). The mixture after this pulverization means a composition of the "Primary pulverization" step shown in Table 1. Next, powder formed by drying the pulverized slurry using a spray dryer was fired for 2 hours at a temperature of 950° C. (firing step). Then, the fired powder was added to water to produce slurry, and then wet pulverized using a ball mill until the average particle diameter reached 0.13 μm or less (secondary pulverization step). After a binder was added to the pulverized slurry, the mixture was dried using a spray dryer to produce a composition. The composition after this drying means a composition of the "Secondary pulverization" step shown in Table 1.

In addition, as Comparative Examples, the $f_y$ and $f_m$ for commercially available partially-stabilized zirconia powders were also calculated. Zirconia of Comparative Example 1 is TZ-3YSB-E manufactured by TOSOH CORPORATION. Zirconia of Comparative Example 2 is Zpex manufactured by TOSOH CORPORATION. Zirconia of Comparative Example 3 is Zpex Smile manufactured by TOSOH CORPORATION.

A composition according to Example 4 was produced in a way where the composition according to Comparative Example 1 was added in addition to zirconium oxide of monoclinic crystal and yttria in the mixing step described above such that the percentage of monoclinic crystal in the composition was lowered compared to Examples 1 to 3.

In the commercially available zirconia powders in Comparative Examples 1 to 3, crystal systems of zirconia were basically tetragonal crystal and cubic crystal, and monoclinic crystal was about 50% at the most. In addition, in the powders of Comparative Examples 1 to 3, an XRD peak of yttria was not confirmed. As such, it is believed that all yttria form a solid solution with zirconia.

On the other hand, in Examples 1 to 3, formation of tetragonal crystal and cubic crystal was partially advanced by the firing step, but 90% or more, much more, 95% or more of the crystal system was monoclinic crystal. In Example 4, about 80% of zirconia was monoclinic crystal because partially-stabilized zirconia of tetragonal crystal was added. In addition, in any of Examples 1 to 4, XRD peaks of yttria were observed. In Example 1, where the additive rate of yttria was low, $f_y$ was 2.5 or higher and 6 or lower. Moreover, in Examples 2 to 4, where the additive rate of yttria was high, $f_y$ was 4 or higher and 10 or lower. The $f_y$ decreases from the primary pulverization step to the secondary pulverization step, but when compared to the $f_y$ immediately after the mixing step and immediately after the firing step, it is believed that this is because the particle diameter and the shape of particles were changed due to the pulverization, thereby reducing the relative peak of yttria to zircoma. However, this does not make a denial of possibility of decrease of $f_y$ due to forming of a solid solution.

TABLE 1

| | Additive Rate of yttria (mol %) | Step | $f_y$ (%) | $f_m$ (%) |
|---|---|---|---|---|
| Example 1-1 | 4 | Primary pulverization | 5.8 | 100 |
| Example 1-2 | | Secondary pulverization | 2.9 | 98 |
| Example 2-1 | 5.5 | Primary pulverization | 8.1 | 100 |
| Example 2-2 | | Secondary pulverization | 4.5 | 97 |
| Example 3-1 | 6 | Primary pulverization | 9.3 | 100 |
| Example 3-2 | | Secondary pulverization | 4.7 | 97 |
| Example 4 | 6 | Primary pulverization | 9.2 | 78 |
| Comparative Example 1 | 3.0 | Commercial product | 0 | 20 |
| Comparative Example 2 | 3.0 | Commercial product | 0 | 52 |
| Comparative Example 3 | 5.3 | Commercial product | 0 | 0 |

Examples 5 to 7 and Comparative Example 4

[Production of Pre-Sintered Body, Measurement of Shrinkage Factor, and Measurement of XRD Pattern]

Pre-sintered body blocks were produced using each composition of Examples 1-2, 3-2 and 4, and Comparative Example 2, and the variation of dimensional change of each pre-sintered body was measured. At first, each composition was press-shaped with a pressure of 300 kg/cm². Next, the press-shaped body was further subjected to the CIP process at 1700 kg/cm² to produce a first shaped body, as mentioned above. The first shaped body was fired to produce a pre-sintered body. Firing of the first shaped body was performed at each of three setting temperatures: 1000° C., 1050° C., and 1100° C. For each firing, 9 first shaped bodies having the same dimensions were produced. The inside of an electric furnace was divided into 3 stages from the top to the bottom, and 3 first shaped bodies were placed on each stage. For each pre-sintered body produced, the diameter of the circular plate was measured. Among 9 pre-sintered bodies produced in one firing, measured diameters of the one with the largest diameter and the one with the smallest diameter (the maximum diameter and the minimum, diameter), as well as the difference between the maximum diameter and the minimum diameter, are shown in Tables 2 to 4. In addition, among the 9 pre-sintered bodies, those with a diameter within a target diameter ±0.15 mm were considered pass. The target diameter was individually set for each of Examples and Comparative Example depending on the composition and the firing temperature. For example, in Example 5-2, the target diameter was set to be 98.20 mm. The numbers of passing products in Examples 5 to 7 and Comparative Example 4 (passing rate) are also shown in Tables 2 to 4.

Table 2 shows the results when the setting temperature of the electric furnace was 1000° C. When the setting temperature of 1000° C. was reached, the lowest temperature in the furnace was 975° C., and the highest temperature was 1025° C. In Examples 5-1 to 7-1, the difference between the maximum dimension and the minimum dimension was allowed to be small compared to Comparative Example 4-1. That is, even though the temperature unevenness was present in the firing furnace, the variation of the shrinkage factor of pre-sintered bodies that were fired at the same occasion was able to be reduced. In addition, for Examples 5-1 to 7-1, the shrinkage factor of all pre-sintered bodies was able to fall within the allowable range, but for Comparative Example 4-1, one third of pre-sintered bodies were outside the allowable range.

Table 3 shows the results when the setting temperature of the electric furnace was 1050° C. When the setting temperature of 1050° C. was reached, the lowest temperature in the furnace was 1040° C., and the highest temperature was 1060° C. In the case where the setting temperature was 1050° C., in Examples 5-2 and 6-2, the variation of the shrinkage factor was also able to be reduced compared to Comparative Example 4-2. In addition, for Examples 5-2 and 6-2, the shrinkage factor of all pre-sintered bodies was able to fall within the permissible range, but for Comparative Example 4-2, one third of pre-sintered bodies were outside the allowable range. In Example 7-2, one pre-sintered body was outside the allowable range, but better results were obtained compared to Comparative Example 4-2.

Table 4 shows the results when the setting temperature of the electric furnace was 1100° C. When the setting temperature of 1100° C. was reached, the lowest temperature in the furnace was 1090° C., and the highest temperature was 1100° C. In the case where the setting temperature was 1100° C., in Examples 5-3 and 6-3, the variation of the shrinkage factor was also able to be reduced compared to Comparative Example 4-3. In addition, some samples were outside the allowable range in Examples 5-3 and 7-3, but their passing rates are able to be higher than that of Comparative Example 4-3.

When the density of each pre-sintered body was measure, the average value was 3.1 g/cm³.

Figure 2:
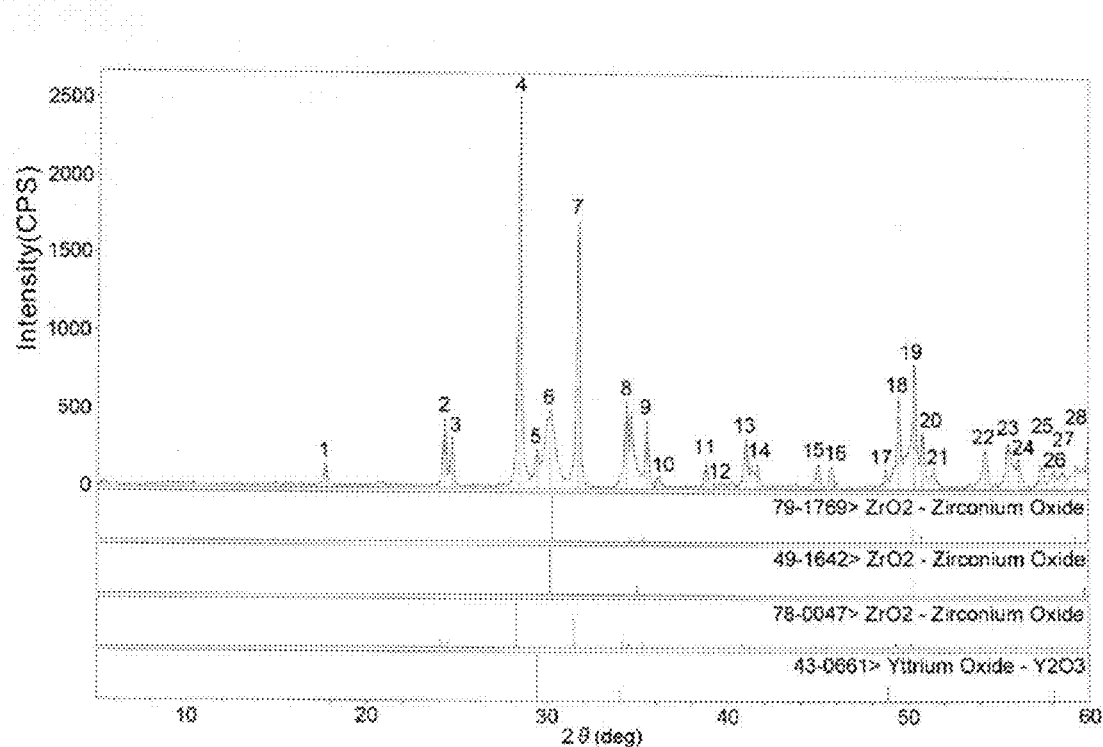
FIG. 2 shows an X-ray diffraction pattern of a pre-sintered body produced in Example 6-2.
Figure 3:
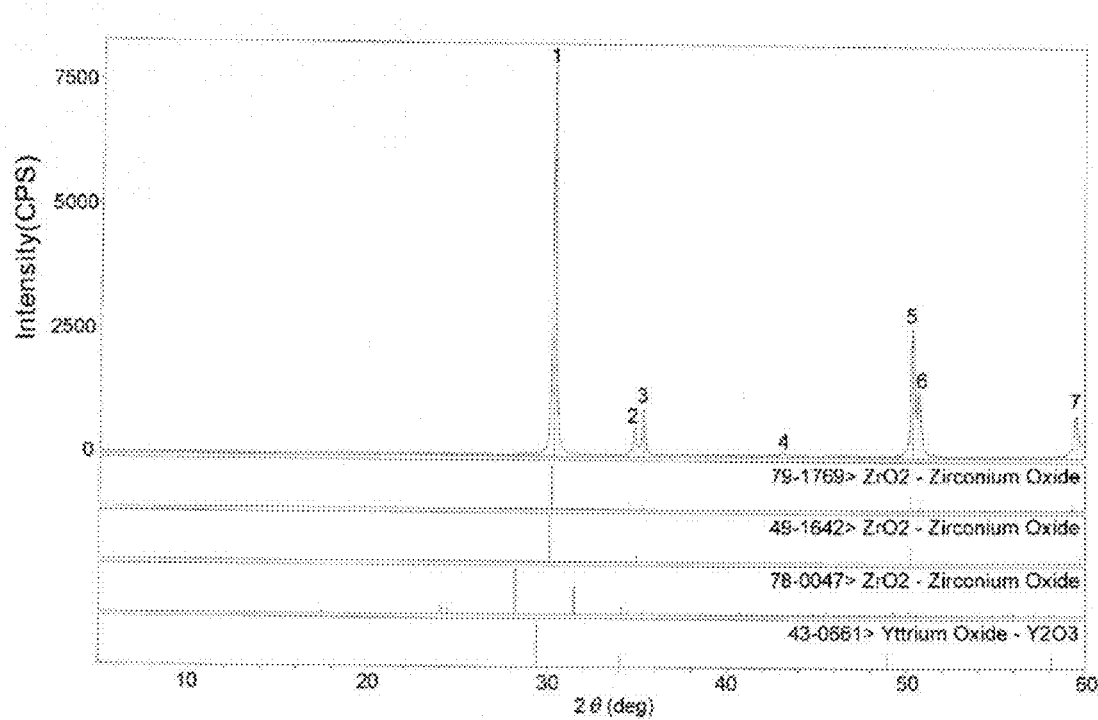
FIG. 3 shows an X-ray diffraction pattern of a pre-sintered body produced in Comparative Example 4-2.

For pre-sintered bodies produced in Example 5-2, Example 6-2, and Comparative Example 4-2, the XRD patterns were measured using CuKα radiation. FIG. 1 shows the XRD pattern of the pre-sintered body produced in Example 5-2. FIG. 2 shows the XRD pattern of the pre-sintered body produced in Example 6-2. FIG. 3 shows the XRD pattern of the pre-sintered body produced in Comparative Example 4-2.

Referring to FIG. 3, in the pre-sintered body of Comparative Example 4-2, any peak of zircoma of monoclinic crystal was not found. In addition, any peak of yttria was not confirmed either. On the other hand, referring to FIG. 1 and FIG. 2, in the pre-sintered bodies of Examples 5-2 and 6-2, peaks of zirconia of monoclinic crystal, tetragonal crystal and cubic crystal were found, and the peaks of monoclinic crystal had a higher intensity. Moreover, in any of the pre-sintered bodies, the peak of yttria was found in the vicinity of 2θ=29.4° (in FIG. 1, peak number 6 and in FIG. 2, peak number 5), and it is believed that a portion of yttria in the pre-sintered body does not form a solid solution with zirconia.

TABLE 2

|  | Composition | Setting temperature (° C.) | Maximum diameter (mm) | Minimum diameter (mm) | Difference (mm) | Number of passes (passing rate (%)) |
|---|---|---|---|---|---|---|
| Example 5-1 | Example 1-2 | 1000 | 98.22 | 98.19 | 0.03 | 9 (100%) |
| Example 6-1 | Example 3-2 | 1000 | 98.19 | 98.12 | 0.07 | 9 (100%) |
| Example 7-1 | Example 4 | 1000 | 97.99 | 97.89 | 0.10 | 9 (100%) |
| Comparative Example 4-1 | Comparative Example 2 | 1000 | 96.95 | 96.56 | 0.39 | 6 (67%) |

TABLE 3

|  | Composition | Setting temperature (° C.) | Maximum diameter (mm) | Minimum diameter (mm) | Difference (mm) | Number of passes (passing rate (%)) |
|---|---|---|---|---|---|---|
| Example 5-2 | Example 1-2 | 1050 | 98.16 | 98.00 | 0.16 | 9 (100%) |
| Example 6-2 | Example 3-2 | 1050 | 98.01 | 98.87 | 0.14 | 9 (100%) |
| Example 7-2 | Example 4 | 1050 | 97.68 | 97.51 | 0.17 | 8 (89%) |

TABLE 3-continued

| | Composition | Setting temperature (° C.) | Maximum diameter (mm) | Minimum diameter (mm) | Difference (mm) | Number of passes (passing rate (%)) |
|---|---|---|---|---|---|---|
| Comparative Example 4-2 | Comparative Example 2 | 1050 | 95.89 | 95.05 | 0.84 | 6 (67%) |

TABLE 4

| | Composition | Setting temperature (° C.) | Maximum diameter (mm) | Minimum diameter (mm) | Difference (mm) | Number of passes (passing rate (%)) |
|---|---|---|---|---|---|---|
| Example 5-3 | Example 1-2 | 1100 | 97.46 | 97.03 | 0.43 | 7 (78%) |
| Example 6-3 | Example 3-2 | 1100 | 97.50 | 97.21 | 0.29 | 9 (100%) |
| Example 7-3 | Example 4 | 1100 | 96.28 | 95.86 | 0.42 | 7 (78%) |
| Comparative Example 4-3 | Comparative Example 2 | 1100 | 93.37 | 92.24 | 1.13 | 3 (33%) |

Examples 8 to 11 and Comparative Examples 5 to 8

[Measurement of Change of Shrinkage Factor Against Firing Temperature]

Pre-sintered bodies were produced under conditions with different firing temperatures, and the shrinkage factor of each pre-sintered body was measured. In Example 8, as a raw material, the composition of Example 1-1 was used as it was. In Example 9, to the composition of Example 1-1, yttria was added and mixed such that the total content of yttria was 6 mol %, the resultant powder being used as a raw material. That is, not-doped yttria was increased in the composition of Example 1-1. In Example 10, as a raw material, the composition of Example 3-1 was used as it was. In Example 11, to the composition of Example 3-1, zirconia not containing yttria was added and mixed such that the content of yttria was 4 mol %, the resultant powder being used as a raw material. In Comparative Example 5, as a raw material, the composition of Comparative Example 1 was used as it was. In Comparative Example 6, as a raw material, the composition of Comparative Example 2 was used as it was. In Comparative Example 7, to the composition of Comparative Example 1, yttria was added and mixed such that the total content of yttria was 6 mol %, the resultant powder being subjected to the primary pulverization step and used as a raw material. In Comparative Example 8, to the composition of Comparative Example 1, yttria was added such that the total content of yttria was 6 mol %, the resultant powder being subjected to the mixing step to the secondary pulverization step mentioned above, and being used as a raw material.

At first, in the same manner as Examples 1 to 3, first shaped bodies were produced. The first shaped bodies were fired to produce pre-sintered bodies with a highest firing temperature varying by every 50° C. in the range of 950° C. to 1200° C., and the shrinkage factor of each pre-sintered body was measured. In each Example, 3 samples were produced, and they were placed at the same position in a firing furnace such that there was no influence of the temperature unevenness in the firing furnace. The dimensions of the first shaped body were the same as those of Examples 5 to 7 mentioned above. The shrinkage factor was calculated from the following equation, and determined as the average value of 3 samples. The results are shown in Table 5. In addition, a graph on which the shrinkage factors are plotted against the firing temperature based on the results shown in Table 5 is shown in FIG. 4.

Shrinkage factor (%)={(Diameter of first shaped body)−(Diameter of pre-sintered body)}/(Diameter of first shaped body)×100

When the XRD patterns of the pre-sintered bodies produced in Examples 8 to 11 were measured, the predominant crystal system of zirconia was monoclinic crystal. In addition, a peak of yttria was found.

Figure 4:
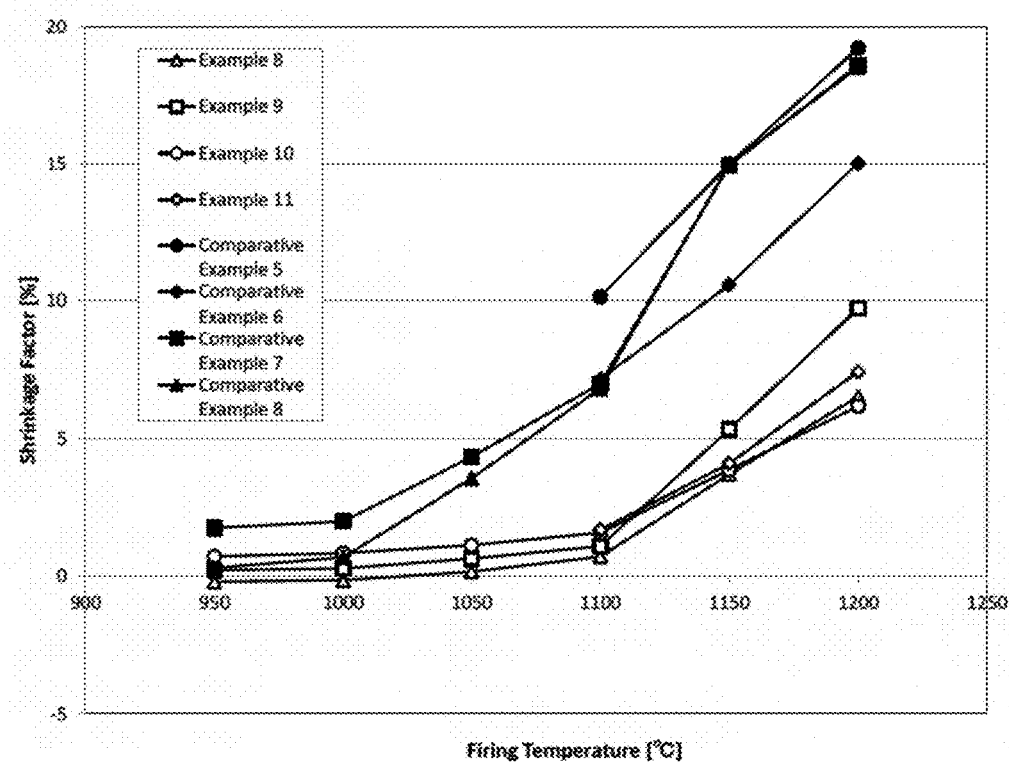
FIG. 4 is a graph showing change of shrinkage factor relative to firing temperature.

Referring to the graph of FIG. 4, in Comparative Examples 5 to 8, the shrinkage rate becomes high from the vicinity of the firing temperature of 1000° C. That is, the rate change temperature can be considered as about 1000° C. On the other hand, in Examples 8 to 11, the shrinkage factor becomes high from the vicinity of the firing temperature of 1100° C. That is, the rate change temperature can be considered as about 1100° C. Therefore, as shown in Comparative Example 4, the compositions according to Comparative Examples have significantly different shrinkage factors (shrinkage rate is high) in the range of 1000° C. to 1100° C. depending on the firing temperature, and thus, pre-sintered bodies having different degrees of shrinkage due to the temperature unevenness in the firing furnace are produced. On the other hand, according to the compositions of the present disclosure, as shown in Examples 5 to 7, shrinkage factors are almost the same in the range of 1000° C. to 1100° C. (the shrinkage rate is low). Therefore, even if the temperature unevenness occurs in the firing furnace, pre-sintered bodies having uniform degrees of shrinkage can be produced.

Crystal systems of zirconia in the compositions of Comparative Examples 5 to 8 are tetragonal crystal and cubic crystal, and monoclinic crystal is not able to be detected substantially. In Comparative Examples 5 and 6, not-doped yttria is not present in the compositions. In Comparative Examples 7 and 8, yttria was added such that not-doped yttria is present in the compositions. On the other hand, in the compositions of Examples 8 to 11, crystal systems of zirconia are predominantly monoclinic crystal, and not-doped yttria is present. As such, it is believed that when a pre-sintered body is produced from a composition mainly formed of monoclinic crystal, the rate change temperature can be elevated.

TABLE 5

|  | Material | Firing Temperature(° C.) | | | | | |
|---|---|---|---|---|---|---|---|
|  |  | 950 | 1000 | 1050 | 1100 | 1150 | 1200 |
| Example 8 | Example 1-1 (Additive free) | −0.20 | −0.15 | 0.16 | 0.71 | 3.71 | 6.53 |
| Example 9 | Example 1-1 (6Y; Mixed) | 0.22 | 0.28 | 0.64 | 1.09 | 5.33 | 9.73 |
| Example 10 | Example 3-1 (Additive free) | 0.72 | 0.83 | 1.12 | 1.58 | 3.86 | 6.18 |
| Example 11 | Example 3-1 (Addition of 0YZrO$_2$) | — | — | — | 1.69 | 4.10 | 7.43 |
| Comparative Example 5 | Comparative Example 1 (Additive free) | — | — | — | 10.15 | 15.00 | 19.21 |
| Comparative Example 6 | Comparative Example 2 (Additive free) | — | — | — | 7.17 | 10.58 | 15.03 |
| Comparative Example 7 | Comparative Example 1 (6Y; Mixed) | 1.75 | 1.99 | 4.33 | 6.99 | 14.94 | 18.59 |
| Comparative Example 8 | Comparative Example 1 (6Y; Secondary pulverization) | 0.30 | 0.69 | 3.56 | 6.82 | 15.01 | 18.51 |

Example 12 and Comparative Example 9

[Measurement of Translucency Relative to Firing Time]

Figure 5:
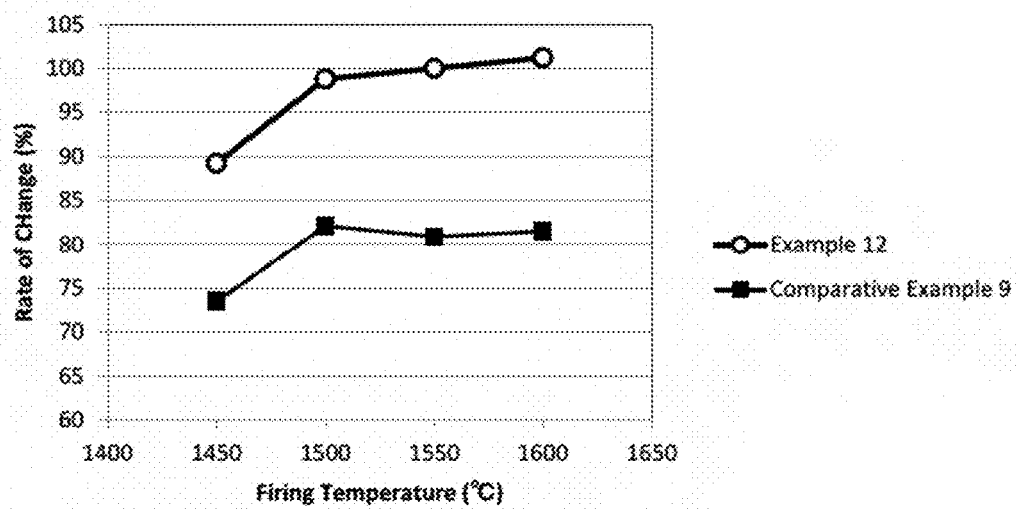
FIG. 5 is a graph showing change of translucency relative to firing temperature.

A sintered body was produced using the composition (pre-sintered body) of the present disclosure, and a relationship between the retention time at the highest temperature and the translucency was investigated. In Example 12, the composition of Example 3-2 was used. At first, a shaped body was produced such that a sintered body with a thickness of 1.2 mm was obtained, and the shaped body was fired for 2 hours at 1000° C. to produce a pre-sintered body. Next, the highest temperature was set to be 1550° C., and the sample (pre-sintered body) was fired for 120 minutes to produce a sintered body. Then, the translucency of the sintered body was measured. Next, for samples produced in the same manner, sintered bodies were produced with highest firing temperatures of 1450° C., 1500° C., 1550° C. and 1600° C., and with the retention time at the highest temperature of 30 minutes, and the translucency for each sintered body was measured. Both the temperature rising rate and the temperature dropping rate are the same between 30-minute firing and 120-minute firing. Change of the translucency 7 of the sintered body that was fired for 30 minutes at the highest temperature relative to the translucency of the sintered body that was fired for 120 minutes at the highest temperature was calculated as a rate of change. As a comparative example, the same test was performed using the composition of Comparative Example 3. The results are shown in Table 6. A graph created based on the rate of change shown in Table 6 is shown in FIG. 5.

The translucency was calculated based on the L* value of lightness (color space) in L*a*b* color system (JIS Z8781) that was measured using a spectrophotometer CE100, analytical software Crystaleye (manufactured by Olympus Corporation). A L* value measured for a sample underlaid by white color was defined as a first L* value and a L* value measured for the same sample as that for measurement of the first L* value, underlaid by black color was defined as a second L* value, and a value obtained by subtracting the second L* value from the first L* value was defined as a numerical value indicating the translucency. Onto the measuring surface of the sample, a contact liquid with the refractive index nD of 1.60 was applied.

In general, by elevating the firing temperature, the translucency of the sintered body can be enhanced. However, in Comparative Example 9, firing with the retention time at the highest temperature of 30 minutes was not able to enhance the translucency even though the firing temperature was elevated, and it was about 80% of the translucency in 120-minute firing. On the other hand, in Example 12, 30-minute firing was able to ensure a translucency equivalent to that in 120-minute firing. Even for the highest firing temperature of 1450° C., the translucency was 85% or more of that in 120-minute firing, and for the highest firing temperature of 1500° C. or higher, the translucency was 95% or more, almost 100% of that in 120° C. firing. As such, according to the composition of the present disclosure, the firing time can be shortened. Accordingly, the production efficiency of the sintered body can be enhanced and the energy costs can also be reduced. In addition, when the composition and pre-sintered body of the present disclosure is used to produce a dental prosthesis, time burden for the patient can be alleviated.

Crystal systems of the composition used in Comparative Example 9 are tetragonal crystal and cubic crystal, and monoclinic crystal is not able to be detected substantially. It is believed that all yttria form a solid solution with zirconia. The composition of Comparative Example 3 used in Comparative Example 9 was in a granular form and it was not possible to measure the average particle diameter, but assuming from Comparative Example 10, it is believed to be 0.7 μm or greater. On the other hand, in the composition of Example 3-2 used in Example 12, crystal systems of zirconia are predominantly monoclinic crystal, and not-doped yttria is present. The average particle diameter was 0.13 μm. It is believed that at least any of these differences affect achievement of short time sintering.

In the XRD pattern of the sintered body produced in Example 12, a peak of monoclinic crystal of zirconia was not detected. In addition, a peak of yttria was not detected either. As such, it is believed that due to the firing for sintering, yttria formed a solid solution with zirconia and zirconia experienced phase transition from monoclinic crystal to cubic crystal.

TABLE 6

| Firing temperature (° C.) | | 1550 | 1450 | 1500 | 1550 | 1600 |
|---|---|---|---|---|---|---|
| Retention time at highest temperature (minutes) | | 120 | 30 | | | |
| Example 12 | Translucency | 16.7 | 14.9 | 16.5 | 16.7 | 16.9 |
|  | Rate of change (%) | — | 89 | 99 | 100 | 101 |
| Comparative Example 9 | Translucency | 16.2 | 11.9 | 13.3 | 13.1 | 13.2 |
|  | Rate of change (%) | — | 73 | 82 | 81 | 81 |

Examples 13 to 14 and Comparative Examples 10 to 12

[Regarding to Influence of not-Doped Yttria and Particle Diameter]

Behaviors were tested in the case where not-doped yttria was present in the composition of Comparative Example 1 and the particle diameter was made smaller. The compositions of Examples 13 and 14 are the same as those of Examples 3-1 and 3-2, respectively. The composition of Comparative Example 10 was the same as that of Comparative Example 1, but the primary pulverization step was performed to a degree where the granule was broken. The composition of Comparative Example 11 was obtained by adding yttria to the composition of Comparative Example 1 such that the content of yttria was 6 mol %, and then being subjected to the primary pulverization step mentioned above until the particle diameter thereof became the same level as that of the composition of Example 3. The composition of Comparative Example 12 was obtained by further subjecting the composition of Comparative Example 11 to the firing step and the secondary pulverization step mentioned above. The results are shown in Table 7 and Table 8. The BET specific surface area was measured in accordance with JIS Z8830 (2013). The average particle diameter was measured, for the powder before forming granules therefrom, via laser diffraction/scattering particle size distribution measuring method. The "shrinkage factor at 1100° C." and the "shrinkage factor at 1150° C." were measured in the same manner as Examples 8 to 11 mentioned above. The "translucency achievement" was determined by, in the same manner as Example 12, retaining a pre-sintered body for 30 minutes at the highest firing temperature of 1550° C. to produce a sintered body and then visually checking whether the translucency of the sintered body was high or not. Evaluation A indicates that the sintered body has a translucency equivalent to that of the sintered body that is retained at the highest temperature for 2 hours, and Evaluation B indicates that the sintered body has a lower translucency compared to the sintered body that is retained at the highest temperature for 2 hours.

The average particle diameter of the composition of Comparative Example 10, that is, Comparative Example 1 is 0.67 μm, which is bigger than that of the composition of the present disclosure. In addition, the shrinkage factor upon pre-sintering gets high, as indicated in Comparative Example 5. In Comparative Example 11, not-doped yttria is present in the composition of Comparative Example 1. Moreover, the average particle diameter of the composition of Comparative Example 11 was at the same level as that of Examples 13 and 14. However, any of the shrinkage factors were high, and the composition was susceptible to the temperature unevenness in the firing furnace. In addition, it was not possible to obtain a sufficient translucency by the sintering with firing for a short time. In Comparative Example 12, it is believed that the additionally added yttria formed a solid solution with zirconia by the firing step. Furthermore, due to the firing step, phase transition from monoclinic crystal to tetragonal crystal and cubic crystal was advanced. However, the results of Comparative Example 11 were similar to those of Comparative Example 12.

The BET specific surface area of the compositions of Examples 13 and 14 were 9 m$^2$/g to 10 m$^2$/g. The average particle diameter was 0.11 μm to 0.13 μm. The shrinkage factor of Examples 13 and 14 has a low value, as shown in Examples 8 to 11. In addition, it was possible to obtain a sufficient translucency even by the sintering with firing for a short time. As such, it is believed the predominant crystal system of zirconia in the composition is required to be monoclinic. There is also a possibility that a high $f_y$ to some extent is preferable.

TABLE 7

| Composition | Treatment | Content rate of yttria (mol %) | $f_y$ (%) | $f_m$ (%) |
|---|---|---|---|---|
| Example 13 | Example 3-1 | — | 6 | 8.5 | 100 |
| Example 14 | Example 3-2 | — | 6 | 8.3 | 97 |
| Comparative Example 10 | Comparative Example 1 | Primary pulverization | 6 | 0.0 | 20 |
| Comparative Example 11 | Comparative Example 1 | Addition of yttria Primary pulverization | 6 | 2.3 | 32 |
| Comparative Example 12 | Comparative Example 1 | Addition of yttria Primary pulverization Firing Secondary pulverization | 6 | 0.0 | 6 |

TABLE 8

| | BET specific surface area (m$^2$/g) | Average particle diameter (μm) | Shrinkage factor at 1100° C. (%) | Shrinkage factor at 1150° C. (%) | Translucency achievement |
|---|---|---|---|---|---|
| Example 13 | 9.82 | 0.117 | 1.14 | 1.95 | A |
| Example 14 | 9.38 | 0.126 | 1.58 | 3.86 | A |
| Comparative Example 10 | 3.87 | 0.673 | 10.15 | 15.00 | — |
| Comparative Example 11 | 17.38 | 0.128 | 6.99 | 14.94 | B |
| Comparative Example 12 | 12.42 | 0.124 | 6.82 | 15.01 | B |

Examples 15 to 21 and Comparative Examples 13 to 16

[Regarding to Influence of Particle Diameter and BET Specific Surface Area]

Compositions having different average particle diameters were produced, and the tests mentioned above were performed on each composition. The content rate of yttria in the composition was set to be 6 mol %. The compositions of Examples 15 to 21 and Comparative Examples 15 to 16 were produced via the hydrolysis method. The composition of Comparative Example 13 was produced via a hydrothermal synthesis method. The composition of Comparative Example 14 was produced via a plasma melting method. The average particle diameters of the compositions of Examples 15 to 21 and Comparative Examples 15 to 16 were measured using the laser diffraction/scattering particle size distribution measuring method. The average particle diameters of the compositions of Comparative Examples 13 and 14 were calculated from the BET specific surface area with the assumption that each particle is a perfect sphere. The BET specific surface areas of the compositions of Examples 15 to 21 and Comparative Examples 13 to 16 were measured in accordance with JIS Z8830 (2013). The results are shown in Table 8. The "achievement of sintering" shows results of testing whether the composition can be sintered by firing at 1550° C. or not. Evaluation A indicates that it was possible to sinter the composition, Evaluation B indicates that the product became clouded, and Evaluation C indicates that the it was not possible to sinter the composition. The "passing rate for shrinkage test" is the same as the passing rate shown in Examples 5 to 7, and is a passing rate when the pre-sintered body was produced at 1100° C. The "rate of change in translucency" is the same as the rate of change shown in Example 12, and is a rate of change when the sintered body was produced at the highest firing temperature of 1550'C.

In any of Examples 15 to 21 with the average particle diameter of 0.08 μm to 0.15 μm and the BET specific surface area of 7 m²/g to 28 m/g, good results were obtained. Particularly, good results were obtained in Examples 16 to 20. On the other hand, in Comparative Examples 13 and 14, it is believed that the average particle diameter was too small, thereby not being able to achieve sufficient sintering. As such, it is believed that the average particle diameter is preferably larger than 0.05 μm, more preferably 0.08 μm or larger, and further preferably 0.10 μm or larger. It is believed that the BET specific surface area is preferably 30 m²/g or lower and more preferably 20 m²/g or lower. In addition, in Comparative Examples 15 and 16, both of the passing rate for shrinkage test and the rate of change in translucency were low. In particular, when Example 21, Comparative Example 15 and Comparative Example 16 were compared, the passing rate for shrinkage test and the rate of change in translucency declined as the average particle diameter got larger (as the BET specific surface area got smaller). As such, there is a possibility that the average particle diameter and/or the BET specific surface area have/has an influence on the rate change temperature and short time sintering. It is believed that the average particle diameter is preferably smaller than 0.18 μm, more preferably 0.15 μm or smaller, and further preferably 0.14 μm or smaller. It is believed that the BET specific surface area is preferably 6.5 m²/g or higher, more preferably 7 m²/g or higher, and further preferably 8 mg or higher.

|  | Average particle diameter (μm) | BET specific surface area (m²/g) | Achievement of sintering | Passing rate for shrinkage test (%) | Rate of change in translucency (%) |
|---|---|---|---|---|---|
| Example 15 | 0.08 | 27.1 | A | 67 | 97 |
| Example 16 | 0.10 | 18.1 | A | 100 | 100 |
| Example 17 | 0.11 | 13.1 | A | 100 | 100 |
| Example 18 | 0.12 | 11.5 | A | 100 | 100 |
| Example 19 | 0.13 | 10.0 | A | 100 | 100 |
| Example 20 | 0.14 | 8.1 | A | 100 | 100 |
| Example 21 | 0.15 | 7.3 | A | 67 | 97 |
| Comparative Example 13 | 0.03 | 31.7 | C | — | — |
| Comparative Example 14 | 0.05 | 20.0 | B | — | — |
| Comparative Example 15 | 0.18 | 6.2 | A | 67 | 87 |
| Comparative Example 16 | 0.25 | 5.1 | A | 33 | 75 |

Example 22

[Observation with Electron Microscope]

Figure 6:
FIG. 6 is an electron micrograph of a granule in Example 3-2.
Figure 7:
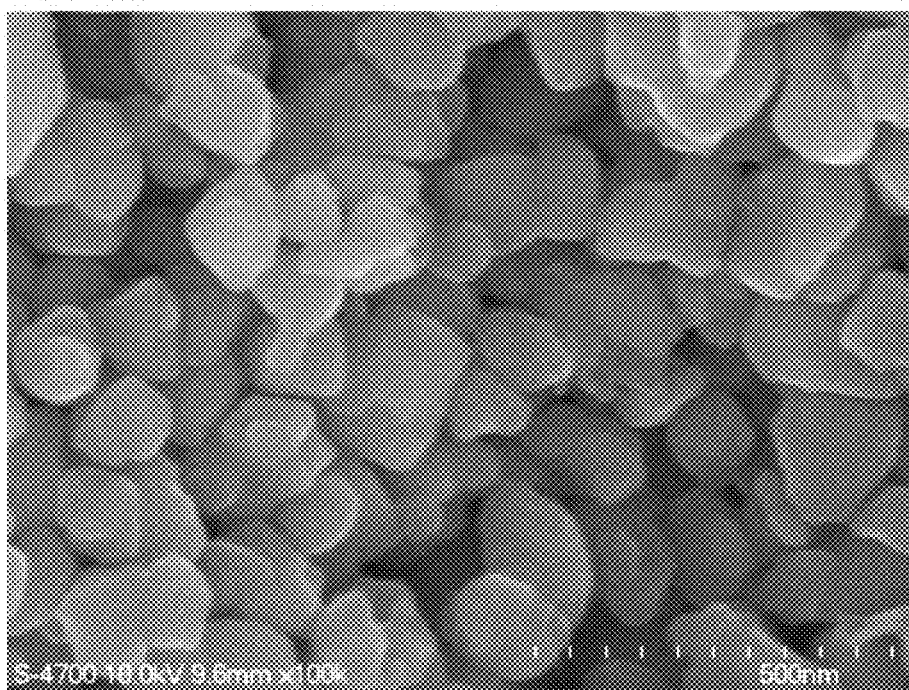
FIG. 7 is an electron micrograph of constituent particles in Example 3-2.
Figure 8:
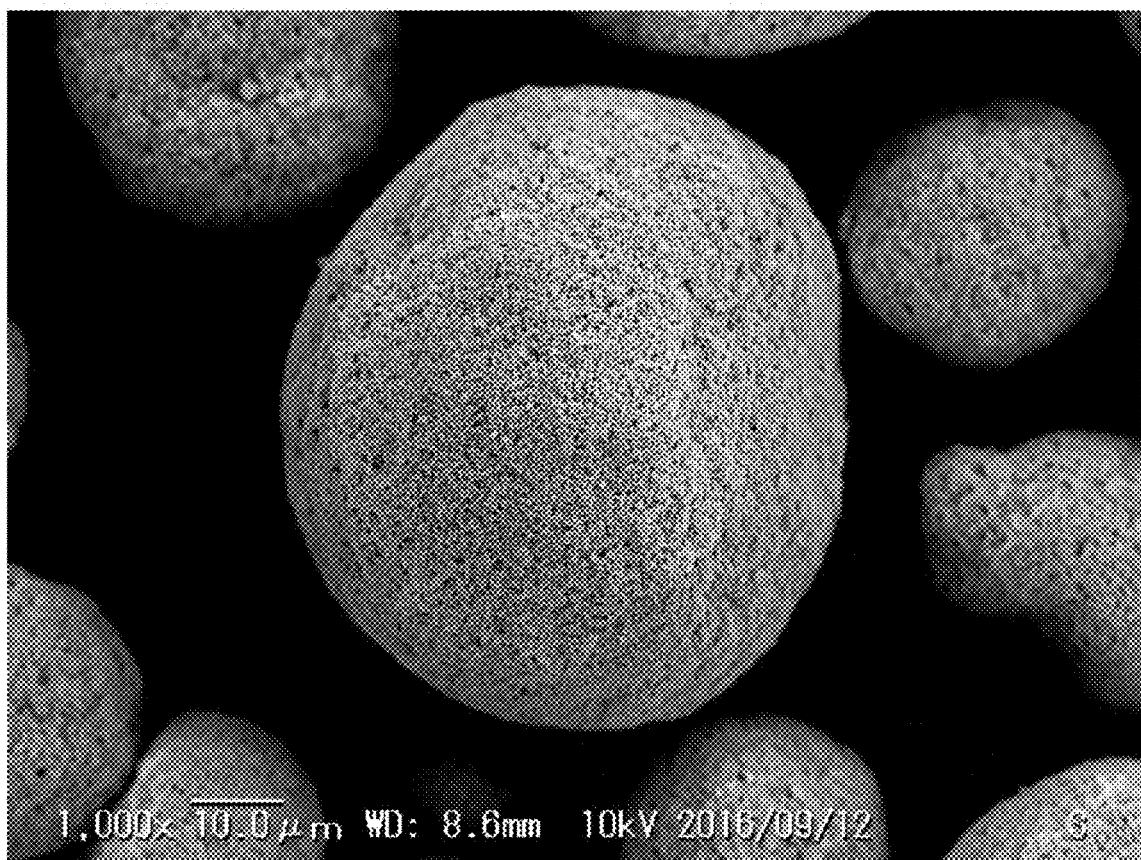
FIG. 8 is an electron micrograph of a granule in Comparative Example 1.
Figure 9:
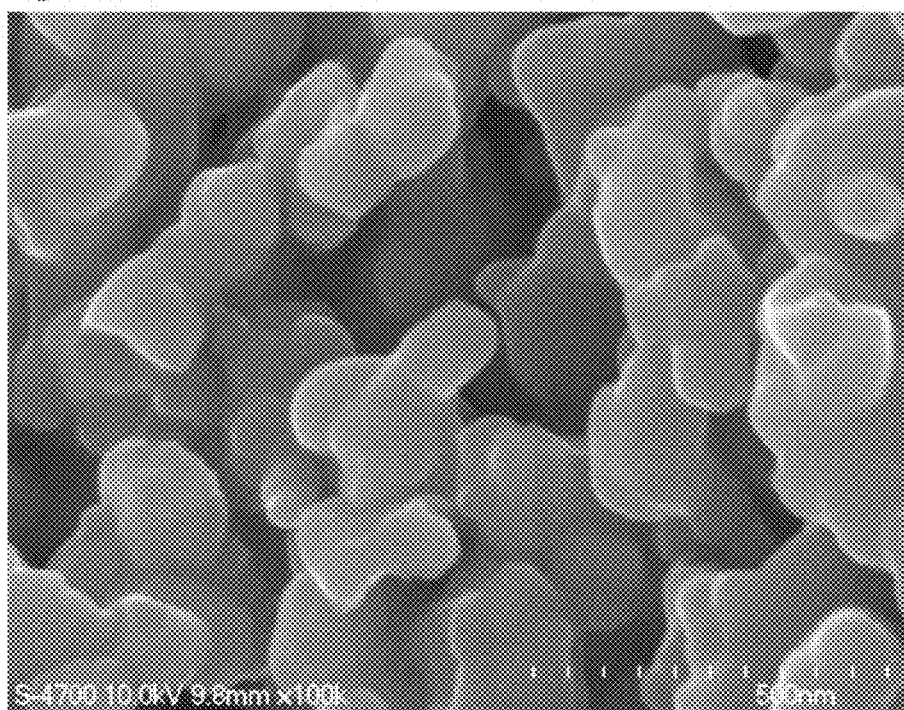
FIG. 9 is an electron micrograph of constituent particles in Comparative Example 1.

As for grannies of Example 3-2 and Comparative Example 1, their shapes were observed using a field emission scanning electron microscope (FE-SEM). In addition, the shapes of particles constituting the granule were also observed. FIG. 6 shows an electron micrograph of the granule in Example 3-2. FIG. 7 shows an electron micrograph of the constituent particle in Example 3-2. FIG. 8 shows an electron micrograph of the granule in Comparative Example 1. FIG. 9 shows an electron micrograph of the constituent particle in Comparative Example 1.

For the granule shown in FIG. 6, the shape of the granule appears to be spherical (perfect sphere), and it is found that the sphericity (circularity) is high. For the particles constituting the granule, shown in FIG. 7, many particles were primary particles that appear to be separable, and the number of secondary particles formed of aggregated primary particles was few. That is, the granule shown in FIG. 6 is predominantly constituted with primary particles. On the other hand, for the granule shown in FIG. 8, the shape of the granule is non-spherical (irregular shape), and it is found that the sphericity (circularity) is low. The particles constituting the granule, shown in FIG. 9, are secondary particles in which primary particles are aggregated in an inseparable manner (secondary particles formed by melting and binding a plurality of primary particles). That is, the granule shown in FIG. 8 is predominantly constituted with distorted secondary particles. It is believed that, because of this, the average particle diameter of Comparative Example 1 is big. For example, according to Comparative Example 10 mentioned above, it is believed that the granule of Comparative Example 1 is formed of constituent particles of at least about 0.7 µm or larger (although there is a possibility that the particles constituting the granule are finely pulverized upon breaking of the granule). In addition, it is believed that the granule in Comparative Example 1 was constituted of distorted secondary particles, and therefore, a difference in the sphericity of the granule was generated.

Example 23

[Measurement of Flexural Strength of Pre-Sintered Body]

The composition of Example 3-2 was fired at a temperature of 1100° C. to produce a pre-sintered body, and the flexural strength was measured thereon under conditions in accordance with JIS R1601 mentioned above, and was found to be 35 MPa.

Examples 24 to 251

[Regarding to Influence of Additive Rate of Yttria]

In Example 13, the test was performed using the composition of Example 3-1, but in Examples 24 to 25, the same tests as Example 13 were also performed for the compositions of Examples 1-1 and 2-1, having different additive rates of yttria. The results are shown in Table 10. A measuring method for each measurement value and evaluation criteria are the same as Example 13.

As is obvious from the comparison between Examples 13 to 14 and Comparative Examples 10 to 12 shown in Table 8, in Examples 24 and 25, the shrinkage factor at 1100° C. and the shrinkage factor at 1150° C. were able to below values. In addition, it was possible to obtain a sufficient translucency even by the sintering with firing for a short time. As such, it is believed that the shrinkage factor upon production of a pre-sintered body and the translucency upon short time sintering are not dependent on the additive rate of yttria. Therefore, for the additive rate of yttria, a desired value can be selected depending on the translucency, strength, etc. of the obtained sintered body.

In Examples 24 and 25, no influence of the BET specific surface area was observed.

particle diameter. The composition of each Example was fired at a temperature of 1000° C. to produce a pre-sintered body, the pre-sintered body was fired for 15 minutes and for 30 minutes, respectively, at the highest firing temperature of 1550° C. to produce sintered bodies, and for each of these sintered bodies, the translucency was measured in the same way as Example 12. The temperature rising rate was set to be 150° C./min, which is the maximum rate for the firing furnace. Cooling was radiational cooling at room temperature. The results are shown in Table 11. The measurement value shown in Table 11 is the average value of 3 measurement values. The rate of change shown in Table 11 indicates a rate of change from the measurement value of the translucency in Example 26 for Examples 27 to 30, and a rate of change from the measurement value of the translucency in Example 31 for Examples 31 to 35.

When a sintered body produced with a retention time at the highest firing temperature of 15 minutes and a sintered body produced with a retention time of 30 minutes were compared, in any of Examples 26 to 35, the translucency was almost not changed. In addition, the obtained translucency was also similar to the translucency of a sintered body obtained with a retention time of 2 hours. As such, it was found that the composition and pre-sintered body of the present disclosure can be sintered even in 15 minutes, which is a very short time.

In Examples 31 to 35 based on the composition of Example 2-2, although the translucency of the sintered body of Example 35 declined a little, there was no big change found in the translucency. That is, for sintered bodies produced from the composition that has experienced the firing step and the secondary pulverization step described above in the composition producing steps, no dependency of the translucency on the average particle diameter of the composition was found. However, in Examples 26 to 30 based on the composition of Example 2-1, the tendency of a sintered body produced from the composition with the average particle diameter of 0.13 µm or greater to have a lower translucency than that of a sintered body produced from the composition with the average particle diameter of

TABLE 10

| | Composition | BET specific surface area (m²/g) | Average particle diameter (µm) | Shrinkage factor at 1100° C. (%) | Shrinkage factor at 1150° C. (%) | Translucency achievement |
|---|---|---|---|---|---|---|
| Example 24 | Example 1-1 | 11.3 | 0.120 | 0.75 | 3.72 | A |
| Example 25 | Example 2-1 | 11.7 | 0.119 | 1.24 | 3.83 | A |

Examples 26 to 35

[Regarding to Influence of Particle Diameter on Translucency]

Based on the compositions of Example 2-1 and Example 2-2, compositions having average particle diameters different from Example 2-1 and Example 2-2 were produced by adjusting the time of the primary pulverization. The compositions of Examples 26 to 30 are the same as the composition of Example 2-1 except for the average particle diameter. The compositions of Examples 31 to 35 are the same as the composition of Example 2-2 except for the average less than 0.13 µm was observed. As such, although the sintered bodies produced in Examples 29 and 30 also have a sufficient translucency for being applied to a dental prosthesis, for example, if the translucency of the sintered bodies is desired to be more enhanced when the sintered bodies are produced from a composition that has not experienced the firing step and the secondary pulverization step described above, it is believed that it is preferred that the average particle diameter of the composition is set as less than 0.13 µm, preferably 0.125 µm or smaller, more preferably 0.120 µm or smaller, and further preferably 0.115 µm or smaller.

TABLE 11

| | | Average particle diameter (μm) | Translucency | | | |
|---|---|---|---|---|---|---|
| | | | Retention time of 15 minutes | | Retention time of 30 minutes | |
| | Composition | | Measurement value | Rate of change (%) | Measurement value | Rate of change (%) |
| Example 26 | Example 2-1 | 0.115 | 16.3 | — | 16.3 | — |
| Example 27 | | 0.120 | 16.3 | 0 | 16.3 | 0 |
| Example 28 | | 0.125 | 16.1 | −1.2 | 16.2 | −0.6 |
| Example 29 | | 0.130 | 15.5 | −4.9 | 15.6 | −4.3 |
| Example 30 | | 0.135 | 15.4 | −5.5 | 15.5 | −4.9 |
| Example 31 | Example 2-2 | 0.115 | 16.2 | — | 16.3 | — |
| Example 32 | | 0.120 | 16.3 | +0.6 | 16.3 | 0 |
| Example 33 | | 0.125 | 16.3 | +0.6 | 16.3 | 0 |
| Example 34 | | 0.130 | 16.2 | 0 | 16.2 | −0.6 |
| Example 35 | | 0.135 | 16.1 | −0.6 | 16.1 | −1.2 |

Example 36

[Regarding to Direct Sintering of Composition]

First shaped bodies produced from the compositions of Example 2-1 and 2-2 were each fired for 30 minutes at the highest temperature of 1550° C. to produce sintered bodies, without going through pre-sintered bodies. Any of the sintered bodies had the translucency equivalent to that of a sintered body produced by going through a pre-sintered body. As such, it was confirmed that, without going through a pre-sintered body, a sintered body can be produced directly from the composition of the present disclosure.

The composition, pre-sintered body and sintered body, as well as the production method thereof, according to the present invention have been described based on the embodiments and Examples described above; however, the present invention is not limited to the embodiments and Examples described above, and various modifications, alterations and improvements to each of the disclosed elements (including elements described in claims, description and drawings) can be included within the scope of the present invention and based on the basic, technical ideas of the present invention. In addition, within the scope of the claims of the present invention, a variety of combinations, substitutions and selections of disclosed elements are possible.

Further problems, objects and embodiments (including modifications) are also revealed from the entire disclosed matters of the present invention including the claims.

Even in the case where there is no particular description, numerical ranges described in this specification should be construed as that any numerical value and range included within those ranges is specifically described in the specification.

INDUSTRIAL APPLICABILITY

The composition, pre-sintered body and sintered body, as well as the production method thereof, according to the present disclosure can be utilized in various applications: dental materials, such as prostheses; connecting components for optical fibers, such as ferrules or sleeves; various kinds of tools (for example, pulverizing balls, grinding tools); various kinds of components (for example, screws, bolts and nuts); various kinds of sensors; components for electronics; decorative materials (for example, watch bands); and the like. When the composition, pre-sintered body and sintered body are used for dental materials, they can be used for, for example, a coping, framework, crown, crown & bridge, abutment, implant, implant screw, implant fixture, implant bridge, implant bar, bracket, denture base, inlay, anlay, onlay, orthodontic wire, laminate veneer and the like.

What is claimed is:

1. A composition comprising:

a zirconia powder, in which 55% or more thereof is monoclinic; and 4.5 mol % or more and less than 5.8 mol % of yttria based on a total amount of moles of zirconia and yttria, wherein an average particle size of zirconia particles and particles of the stabilizer is 0.06 μm to 0.17 μm, wherein at least a portion of the stabilizer does not form a solid solution with zirconia, and wherein $f_y$ calculated based on the following expression 1 is 3% or more:

[Expression 1]
$$f_y(\%) = \frac{I_y(111)}{I_y(111) + I_m(111) + I_m(11-1) + I_t(111) + I_c(111)} \times 100$$

wherein $I_y$ (111) represents a peak intensity of plane (111) of yttria in an X-ray diffraction pattern using CuKα radiation, $I_m$ (111) and $I_m$ (11-1) represent peak intensities of plane (111) and plane (11-1) of monoclinic zirconia in the X-ray diffraction pattern, respectively, $I_t$ (111) represents a peak intensity of plane (111) of tetragonal zirconia in the X-ray diffraction pattern, and $I_c$ (111) represents a peak intensity of plane (111) of cubic zirconia in the X-ray diffraction pattern.

2. A composition comprising:

a zirconia powder, in which 55% or more thereof is monoclinic; and 5.8 mol % or more and less than 7.5 mol % of yttria based on a total amount of moles of zirconia and yttria, wherein an average particle size of zirconia particles and particles of the stabilizer is 0.06 μm to 0.17 μm, wherein at least a portion of the stabilizer does not form a solid solution with zirconia, and wherein $f_y$ calculated based on the following expression 2 is 4% or more:

$$f_y(\%) = \frac{I_y(111)}{I_y(111) + I_m(111) + I_m(11-1) + I_t(111) + I_c(111)} \times 100 \quad \text{[Expression 2]}$$

wherein $I_y$ (111) represents a peak intensity of plane (111) of yttria in an X-ray diffraction pattern using CuKα radiation, $I_m$ (111) and $I_m$ (11-1) represent peak intensities of plane (111) and plane (11-1) of monoclinic zirconia in the X-ray diffraction pattern, respectively, $I_t$ (111) represents a peak intensity of plane (111) of tetragonal zirconia in the X-ray diffraction pattern, and $I_c$ (111) represents a peak intensity of plane (111) of cubic zirconia in the X-ray diffraction pattern.

3. The composition according to claim 1, wherein a BET specific surface area is 7.5 m²/g to 25 m²/g.

4. The composition according to claim 2, wherein a BET specific surface area is 7.5 m²/g to 25 m²/g.

5. The composition according to claim 1, wherein 80% or more of zirconia is monoclinic.

6. The composition according to claim 2, wherein 80% or more of zirconia is monoclinic.

7. The composition according to claim 1, wherein the average particle diameter is 0.10 μm to 0.14 μm.

8. The composition according to claim 2, wherein the average particle diameter is 0.10 μm to 0.14 μm.

9. The composition according to claim 1, wherein the average particle diameter is less than 0.13 μm.

10. The composition according to claim 2, wherein the average particle diameter is less than 0.13 μm.

11. The composition according to claim 1, wherein the average particle diameter is less than 0.115 μm.

12. The composition according to claim 2, wherein the average particle diameter is less than 0.115 μm.

13. The composition according to claim 1, wherein said $f_y$ is 15% or less.

14. The composition according to claim 2, wherein said $f_y$ is 15% or less.

15. The composition according to claim 1, wherein the composition has not been subject to firing at a temperature of 700° C. or higher.

16. The composition according to claim 2, wherein the composition has not been subject to firing at a temperature of 700° C. or higher.

* * * * *